United States Patent
Crafford et al.

(10) Patent No.: US 12,556,458 B1
(45) Date of Patent: *Feb. 17, 2026

(54) INDUSTRIAL EQUIPMENT DIAGNOSTIC SYSTEM

(71) Applicant: NORFOLK SOUTHERN CORPORATION, Atlanta, GA (US)

(72) Inventors: Ingrid Crafford, Atlanta, GA (US); Nhut Doan, Atlanta, GA (US); Dennis Quinn, Atlanta, GA (US); Jeremy Laskos, Atlanta, GA (US)

(73) Assignee: Norfolk Southern Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,508

(22) Filed: Nov. 30, 2023

Related U.S. Application Data

(63) Continuation of application No. 17/849,158, filed on Jun. 24, 2022, now Pat. No. 11,870,659.

(51) Int. Cl.
*H04L 41/149* (2022.01)
*H04L 12/40* (2006.01)

(52) U.S. Cl.
CPC ........... *H04L 41/149* (2022.05); *H04L 12/40* (2013.01); *H04L 2012/40215* (2013.01)

(58) Field of Classification Search
CPC .................. H04L 12/40; H04L 41/149; H04L 2012/40215
See application file for complete search history.

(56) References Cited

U.S. PATENT DOCUMENTS

| | | | | |
|---|---|---|---|---|
| 2014/0142801 | A1* | 5/2014 | Shah | G06F 17/00 701/32.7 |
| 2018/0305879 | A1* | 10/2018 | Grenier | G05B 15/02 |
| 2020/0195468 | A1* | 6/2020 | Kwon | H04L 12/40013 |
| 2022/0159018 | A1* | 5/2022 | Kim | H04W 4/48 |

OTHER PUBLICATIONS

Notice of Allowance for U.S. Appl. No. 17/849,158, mailed Aug. 30, 2023, 08 Pages.

* cited by examiner

*Primary Examiner* — Gil H. Lee
(74) *Attorney, Agent, or Firm* — Bradley Arant Boult Cummings LLP; Daniel E. Sineway, Esq.; Micah Hensley, Esq.

(57) ABSTRACT

Systems, methods, and apparatuses for industrial equipment diagnostics are disclosed. Specifically, a bus controller operatively connected to a processor is physically connected to two or more controller area network (CAN) buses, wherein each CAN bus operates according to a different protocol. The bus controller is configured to control the rate at which messages are received on certain buses by adjusting parameters such as a baud rate and sample rate. The bus controller is further configured to filter or mask certain CAN bus messages based on identifiers within the messages. The bus controller is operatively connected to a remote processing system for processing the CAN bus messages from their raw data format into a useable format. The remote processing system performs diagnostic analysis on the processed CAN bus messages, and furthermore performs predictive analytics on the processed CAN bus messages to identify patterns or discrete events indicative of future system failures.

33 Claims, 5 Drawing Sheets

INDUSTRIAL EQUIPMENT DIAGNOSTIC SYSTEM

CROSS REFERENCE TO RELATED APPLICATIONS

This application is a continuation of, and claims the benefit of and priority to, U.S. Non-Provisional patent application Ser. No. 17/849,158, filed on Jun. 24, 2022 and entitled "Industrial Equipment Diagnostic System," the disclosure of which is incorporated herein by reference in its entirety.

TECHNICAL FIELD

The present disclosure relates to equipment diagnostics, and more specifically to industrial equipment diagnostics using controller area network (CAN) buses for data collection.

BACKGROUND

Traditionally, industrial equipment and machinery have lacked sophisticated diagnostic systems, or any diagnostic systems at all. While innovation in technical fields such as the Internet-of-Things ("IoT") continues to grow, and inter-connectivity between various types of devices has become more prominent, technological progress and development directed towards industrial equipment has lagged behind other more consumer-facing verticals like appliances and smart devices. Therefore, there exists a long-felt but unresolved need for an equipment diagnostic system, and more particularly for an industrial equipment diagnostics system.

BRIEF SUMMARY OF DISCLOSURE

Briefly described, and according to one embodiment, aspects of the present disclosure relate generally to equipment diagnostics, and more particularly to industrial equipment diagnostics using CAN buses for data collection.

As will be described in greater detail herein, the present disclosure relates to systems, methods, and apparatuses, configured to execute, perform, or facilitate, equipment diagnostics. In one embodiment, an exemplary system in accordance with the present disclosure is configured to execute steps for performing diagnostics on industrial equipment such as cranes, trucks, tractors, excavators, and other similar industrial equipment.

For purposes of discussion, consider a scenario in which the disclosed systems, methods, and apparatuses, are integrated with and configured to operate in connection with an industrial crane, such as a gantry crane (sometimes referred to as an overhead crane or bridge crane). A gantry crane is a type of crane commonly used at shipping ports and rail yards for hoisting shipping containers on and off from their carriers (e.g., trains, ships, etc.). Gantry cranes are typically configured such that a hoisting device is elevated and straddled above the port, yard, or area from which objects will be hoisted (e.g., raised or lowered), and the hoisting device may move laterally across girders, beams, or a similar track. Further, at each end of the girders are the crane legs, and the crane legs may similarly be integrated with a track along which the crane may move (perpendicular to the lateral motion of the hoist). In certain embodiments, instead of the crane legs being integrated with a track, the crane legs may be integrated with a wheel and tire system. These cranes are generally made operational by a combination of engines/motors for moving the hoisting devices and crane legs along their respective tracks, engines/motors for lowering and raising the hoist, and also control systems for managing, commanding, directing, and regulating the engines, motors, and other devices on the crane. Gantry cranes, and all cranes in general, vary in degrees of complexity and therefore some cranes include a plurality of auxiliary devices and supporting equipment on the crane.

In at least one embodiment, an exemplary system in accordance with the present disclosure includes a controller area network (CAN) bus controller (also referred to herein as the "industrial controller," "bus controller," or simply as the "controller") configured to receive CAN messages and data formatted according to multiple communication protocols.

In various embodiments, a CAN bus is a two-wire communication bus (including both a high and low wire/channel), where the physical states of the two wires are logically combined for generating a single serial signal. Generally, the International Organization for Standardization (ISO) defines the physical layer standards for CAN buses, for example, the ISO 11898 which specifies the electrical aspects of the physical layer (e.g., voltage, current, conductors, etc.). Certain industries have established and adopted specific protocols based on ISO physical layer standards, like the J1939 protocol discussed in more detail below, which is used primarily for industrial equipment.

A CAN bus connects two or more nodes, or electronic control units (ECUs), that are physically connected to both the high and low bus wires. A particular piece of equipment may include a plurality of ECU's, each of which may rely on data from another ECU for processing or executing its own data. In one embodiment, ECUs typically transmit sensor data over the CAN bus, and an ECU at a crane hoist may rely on sensor data from an ECU operatively connected to a piston on the crane (for example, the hoist may only become engaged if the piston is not actively engaged). As mentioned above, CAN buses include two transmission wires, a CAN high wire, and a CAN low wire. Each ECU is operatively connected to the CAN bus (and thus the high and low wires), and therefore all connected ECUs may receive transmissions from other ECUs and can determine whether to act upon the data transmissions or ignore them.

According to various aspects of the present disclosure, CAN bus data typically includes a series of binary bits (the series of bits is also referred to herein as a "frame"), and those bits represent hexadecimal binary data communicated between ECUs on the CAN bus. In one embodiment, the raw hexadecimal CAN messages may be transformed or decoded from their raw format into a human-readable and useable format via a vector data file referred to as a "DBC" file (an acronym for CAN database). In various embodiments, DBC files are used to identify CAN messages and translate the raw CAN data, as transmitted within a CAN frame, to meaningful values and meaningful information. In certain embodiments, a DBC file is an ASCII-based translation file used to apply identifying names, scaling calculations, offset calculations/operations, and defining information, to data transmitted within a CAN frame. In certain embodiments, DBC files may be configured based on the equipment being monitored and the types of CAN messages being transmitted by the equipment.

For example, the J1939 protocol is just one example of a CAN protocol and standard for which a DBC files may be generated. The J1939, or SAE J1939 protocol, is a CAN bus protocol developed by the Truck Bus Control and Communications Network Committee for standardizing the format in which diagnostic information is transmitted. While there is no DBC file specific to the J1939 protocol, the committee assigned various identifiers, names, numbers, and formats that are to be represented in a DBC file for the J1939 protocol. Other CAN bus protocols, such as the CANopen protocol, do not have an available assignment of identifiers, names, numbers, etc., from which to configure a DBC file, and therefore proprietary solutions for processing the CANopen messages may need to be developed. In various embodiments, CANopen was developed as a standardized embedded network with highly flexible configuration capabilities, and accordingly CANopen comprises higher-layer open systems interconnection (OSI) model profile specifications than the J1939 protocol. For example, the CANopen protocol allows for each device connected to the bus to be associated with a device/node profile defining its configuration, which may be defined in the OSI application layer. Furthermore, the CANopen protocol allows for various communication models to be implemented between the nodes connected to the bus, such as a master/slave model, a client/server model, and a consumer/producer model. According to various aspects of the present disclosure, each of these communication models allows for data from one or more nodes on the bus to be provided to one or more other nodes in a specific manner and based on their respective device profiles. In particular embodiments, the device profiles may also support multiple states (such as a master node changing or resetting the state of a slave node).

In various embodiments, the bus controller in the system discussed herein may be configured to receive data formatted in accordance with both the J1939 protocol and the CANopen protocol. For example, in one embodiment, the bus controller may receive J1939 messages from an engine operating at a gantry crane, and the bus controller may also receive CANopen messages from a hoist, piston, or a programmable logic controller (PLC) at a gantry crane. In at least one embodiment, the system may also be configured to receive data formatted in accordance with other CAN protocols not discussed in great length herein, such as OBD2 (on-board vehicle diagnostics based on ISO 15765) and CAN FD (CAN flexible data-rate), and it should be understood from the disclosure herein that the system is configured to process CAN frames of multiple different CAN bus protocols. According to various aspects of the present disclosure, being configured to receive and process messages formatted in accordance with two or more different types of CAN bus protocols provides a specific improvement over prior systems, which are typically only configured to process messages of a single CAN bus protocol.

According to various aspects of the present disclosure, the controller may be physically attached to the equipment from which it is receiving data (e.g., a gantry crane), the controller may be physically proximate to the equipment (e.g., at a base station nearby the gantry crane), or the controller may be positioned in a more remote location (e.g., in a server warehouse).

In various embodiments, at least one advantage and improvement over prior systems provided by the disclosed system is its ability to control the types of CAN data messages it receives (e.g., messages from certain nodes, messages communicating certain information, etc.), as well as the rate at which it receives CAN bus messages. In at least one embodiment, the controller is configured to execute predetermined masks or filters against CAN bus messages for controlling the CAN bus message types it receives. For example, a CAN bus message mask may only allow for certain predetermined message types to be received, while a CAN bus filter generally receives all message types but discards certain message types determined to be undesirable or unnecessary for subsequent processing. According to various aspects of the present disclosure, the system may control, or "throttle," the rate at which CAN bus messages are received at the industrial controller. In a particular embodiment, the system may control the rate at which CAN bus messages are received by dynamically adjusting a baud rate at the controller and/or a CAN bus message sample rate. As will be understood by one of ordinary skill in the art, a baud rate is generally the rate or speed at which information is transmitted over a communication channel (typically measured in bits per second). Further, a sample rate is generally the frequency at which data samples are taken, received, or retrieved, from a particular signal (typically, but not always, an analog signal). In at least one embodiment, a sample rate may also correspond to how frequently an entire CAN data frame is read from the bus I/O at the industrial controller (while many other CAN data frames may have been available to be read from the bus I/O but were not). In one embodiment, throttling the baud rate and/or sample rate provides an advantage over prior systems as it allows for the system to reduce the amount of redundant or superfluous data received, while still receiving the necessary information for diagnostic processing, therefore also reducing downstream storage and processing needs.

In at least one embodiment, the CAN bus controller is operatively connected to a cellular router for transmitting CAN bus messages from the CAN bus controller to a remote processing system. For example, the cellular router may be a MG90 multi-network vehicle router manufactured by Sierra Wireless, headquartered in Richmond, Canada. Other cellular routers or wireless transmitters with specifications similar to the MG90 router may also be configured to operate within the system. According to various aspects of the present disclosure, the CAN bus controller may be operatively connected to the MG90 router over a physical wired network connection (e.g., Ethernet, or the like), or the CAN bus controller may be configured to transmit the CAN bus messages to the router over a wireless network (e.g., Wi-Fi, Bluetooth, wireless local area networks, etc.). In other embodiments, the system may transmit the CAN bus messages to the remote processing system via a radio frequency (RF) transmitter, or other wireless receiving and transmitting (RX/TX) devices.

In a particular embodiment, the remote processing system includes one or more servers configured to receive, store, and process CAN bus data. For example, a receiving module (e.g., a wireless communications receiver or any appropriate RX/TX component) at the server may receive the CAN bus messages from the bus controller, and the server may store the CAN bus messages as-is in the raw data format in which the messages were received. In various embodiments, the system may then process the CAN bus messages by converting the messages from their raw data format (e.g., hexadecimal values) into a workable data format that can be understood by humans (for example, converting a hexadecimal value into engine revolutions per minute (RPMs)). In at least one embodiment, processing units at the server may process a CAN bus message in its raw data format by parsing the message and extracting certain hexadecimal portions of the message, and furthermore performing bitwise operations on the hexadecimal portions of the message to determine an associated value representative of a measurable aspect of the specific equipment from which the message originated. In various embodiments, the server may retain a copy of the CAN bus messages in their raw data format, in addition to the processed message data, for future processing.

In certain embodiments, the remote processing system performs diagnostics and other algorithmic processing on the CAN bus data for determining patterns, anomalies, or other discrete events within the data. Further, the remote processing system may simply track certain aspects of the processed CAN bus messages, for example, the run time of a specific engine operating at a gantry crane. Tracking these aspects or metrics allows for the system to predict, anticipate, and mitigate equipment failures and similar risks in the system. In some embodiments, the remote processing system may include a user-facing dashboard or graphical user interface platform for displaying the tracked equipment metrics to a user. Furthermore, the remote processing system may further be configured to automatically generate requests for repair, replacement parts, or general servicing, without any human interaction.

In various embodiments, the present disclosure discusses a system including: an industrial controller, wherein the industrial controller includes separate physical connections to each controller area network (CAN) bus in a plurality of CAN buses, and wherein at least two CAN buses of the plurality of CAN buses include different and incompatible communication protocols for transmitting CAN messages along their respective CAN buses; a wireless communications router operatively connected to the industrial controller; and a processor operatively connected to the industrial controller and the wireless communications router, wherein the processor is configured to: receive a first CAN message from a first CAN device transmitted along a first CAN bus of the at least two CAN buses, wherein the first CAN message includes a sequence of raw hexadecimal and binary digits formatted according to a first CAN protocol; receive a second CAN message from a second CAN device transmitted along a second CAN bus of the at least two CAN buses, wherein the second CAN message includes a sequence of raw hexadecimal and binary digits formatted according to a second CAN protocol, and wherein the second CAN protocol is different from and incompatible with the first CAN protocol; determine that the first CAN message and the second CAN message do not include a filter term, wherein the filter term includes CAN message metadata predetermined to correspond to a particular CAN message to be excluded from subsequent processing; and transmit, via the wireless communications router, the first CAN message and the second CAN message to a remote processing system, wherein the remote processing system is configured to convert both sequences of the raw hexadecimal and binary digits corresponding to the first CAN message and the second CAN message into their respective first CAN device and second CAN device real-world formats.

In various embodiments, regarding the system, the first CAN protocol includes the J1939 protocol. In particular embodiments, the second CAN protocol includes the CANopen protocol. According to various aspects of the present disclosure, determining that the first CAN message and the second CAN message do not include a filter term further includes comparing a plurality of filter terms to portions of both the first CAN message and the second CAN message known to include hexadecimal and/or binary digits representative of a CAN message source device, a CAN message destination device, or a CAN message type.

In particular embodiments, regarding the system, the remote processing system includes at least one database and a processor configured to: receive the first CAN message and the second CAN message from the industrial controller; store, in the at least one database, the first CAN message and the second CAN message according to their respective sequences of raw hexadecimal and binary digits; process the first CAN message and the second CAN message according to predetermined mapping logic determined based on identification information extracted from the first CAN message and the second CAN message, wherein the predetermined mapping logic includes bitwise scaling and offsetting calculations for converting the first CAN message and the second CAN message into a first CAN message expected value and a second CAN message expected value, respectively, represented in the real-world formats corresponding to the first CAN device and the second CAN device. In at least one embodiment, the processor at the remote processing system is further configured to compare the first CAN message expected value to a first predetermined expected value corresponding to the first CAN device, and to compare the second CAN message expected value to a second predetermined expected value corresponding to the second CAN device for diagnosing operational inefficiencies at the first CAN device and the second CAN device.

In various embodiments, regarding the system, the processor at the industrial controller is configured to receive the first CAN message or the second CAN message according to a predetermined sample rate. Furthermore, in various embodiments, the predetermined sample rate includes a CAN message receiving frequency of one CAN message every ten seconds. Moreover, in various embodiments, receiving the first CAN message or the second CAN message according to a predetermined sample rate includes reading a sequence of binary signals corresponding to the first CAN message or the second CAN message, as detected by the industrial controller at the physical connection to the first CAN bus or the physical connection to the second CAN bus, and storing the sequence of binary signals into computer memory at the industrial controller for subsequent processing, once every ten seconds.

In at least one embodiment, regarding the system, the first CAN message or the second CAN message are received in response to the industrial controller detecting a CAN device state change indicated in the first CAN message or the second CAN message. In particular embodiments, the first CAN device real-world format and the second CAN device real-world format are each represented in human-readable formats including a decimal numeral notation, an integer notation, or a scientific notation.

In one embodiment, the present disclosure discusses a method including the steps of: receiving, at an industrial controller including separate physical connections to each controller area network (CAN) bus in a plurality of CAN buses, a first CAN message from a first CAN device transmitted along a first CAN bus of at least two CAN buses of the plurality of CAN buses, wherein the first CAN message includes a sequence of raw hexadecimal and binary digits formatted according to a first CAN protocol, and wherein the at least two CAN buses include different and incompatible communication protocols for transmitting CAN messages along their respective CAN buses; receiving a second CAN message from a second CAN device transmitted along a second CAN bus of the at least two CAN buses, wherein the second CAN message includes a sequence of raw hexadecimal and binary digits formatted according to a second CAN protocol, and wherein the second CAN protocol is different from and incompatible with the first CAN protocol; determining that the first CAN message and the second CAN message do not include a filter term, wherein the filter term includes CAN message metadata predetermined to correspond to a particular CAN message to be excluded from subsequent processing; and transmitting, via a wireless communications router operatively connected to the industrial controller, the first CAN message and the second CAN message to a remote processing system, wherein the remote processing system is configured to convert both sequences of the raw hexadecimal and binary digits corresponding to the first CAN message and the second CAN message into their respective first CAN device and second CAN device real-world formats.

In various embodiments, regarding the method, the first CAN protocol includes the J1939 protocol. In particular embodiments, the second CAN protocol includes the CANopen protocol. According to various aspects of the present disclosure, determining that the first CAN message and the second CAN message do not include a filter term further includes comparing a plurality of filter terms to portions of both the first CAN message and the second CAN message known to include hexadecimal and/or binary digits representative of a CAN message source device, a CAN message destination device, or a CAN message type.

In particular embodiments, regarding the method, the remote processing system includes at least one database and a processor configured to: receive the first CAN message and the second CAN message from the industrial controller; store, in the at least one database, the first CAN message and the second CAN message according to their respective sequences of raw hexadecimal and binary digits; process the first CAN message and the second CAN message according to predetermined mapping logic determined based on identification information extracted from the first CAN message and the second CAN message, wherein the predetermined mapping logic includes bitwise scaling and offsetting calculations for converting the first CAN message and the second CAN message into a first CAN message expected value and a second CAN message expected value, respectively, represented in the real-world formats corresponding to the first CAN device and the second CAN device. In at least one embodiment, the processor at the remote processing system is further configured to compare the first CAN message expected value to a first predetermined expected value corresponding to the first CAN device, and to compare the second CAN message expected value to a second predetermined expected value corresponding to the second CAN device for diagnosing operational inefficiencies at the first CAN device and the second CAN device.

In various embodiments, regarding the method, the processor at the industrial controller is configured to receive the first CAN message or the second CAN message according to a predetermined sample rate. Furthermore, in various embodiments, the predetermined sample rate includes a CAN message receiving frequency of one CAN message every ten seconds. Moreover, in various embodiments, receiving the first CAN message or the second CAN message according to a predetermined sample rate includes reading a sequence of binary signals corresponding to the first CAN message or the second CAN message, as detected by the industrial controller at the physical connection to the first CAN bus or the physical connection to the second CAN bus, and storing the sequence of binary signals into computer memory at the industrial controller for subsequent processing, once every ten seconds.

In at least one embodiment, regarding the method, the first CAN message or the second CAN message are received in response to the industrial controller detecting a CAN device state change indicated in the first CAN message or the second CAN message. In particular embodiments, the first CAN device real-world format and the second CAN device real-world format are each represented in human-readable formats including a decimal numeral notation, an integer notation, or a scientific notation.

These and other aspects, features, and benefits of the claimed invention(s) can become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

Further features and benefits of the present disclosure will be apparent from a detailed description of various embodiments thereof taken in conjunction with the following drawings, wherein similar elements are referred to with similar reference numbers, and wherein.

DETAILED DESCRIPTION

Figure 1:
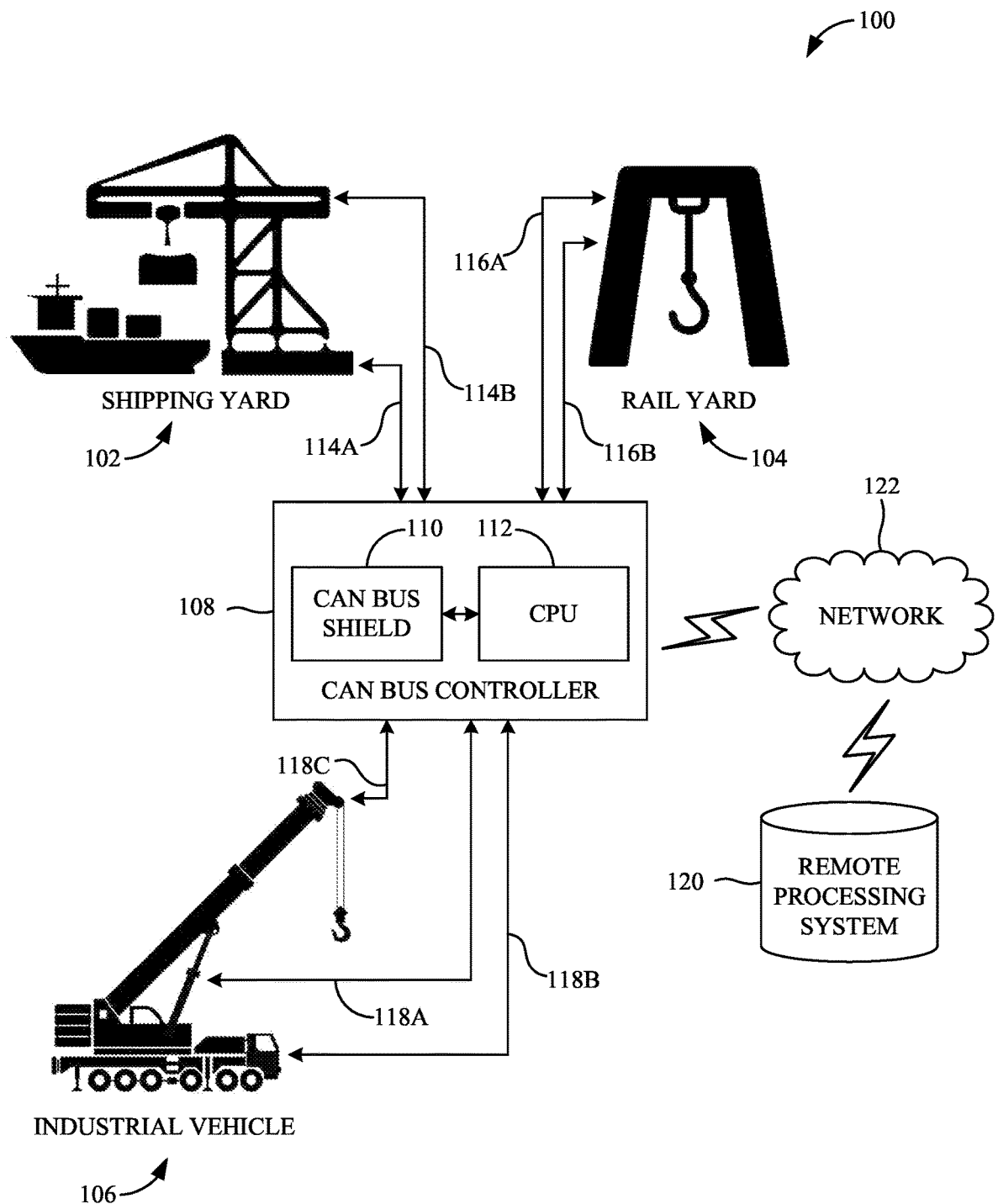
FIG. 1 is an exemplary system environment, according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to equipment diagnostics, and more specifically to industrial equipment diagnostics using CAN buses for data collection.

As will be described in greater detail herein, the present disclosure relates to systems, methods, and apparatuses, configured to execute, perform, or facilitate, equipment diagnostics. In one embodiment, an exemplary system in accordance with the present disclosure is configured to execute steps for performing diagnostics on industrial equipment such as cranes, trucks, tractors, excavators, and other similar industrial equipment.

For purposes of discussion, consider a scenario in which the disclosed systems, methods, and apparatuses, are integrated with and configured to operate in connection with an industrial crane, such as a gantry crane (sometimes referred to as an overhead crane or bridge crane). A gantry crane is a type of crane commonly used at shipping ports and rail yards for hoisting shipping containers on and off from their carriers (e.g., trains, ships, etc.). Gantry cranes are typically configured such that a hoisting device is elevated and straddled above the port, yard, or area from which objects will be hoisted (e.g., raised or lowered), and the hoisting device may move laterally across girders, beams, or a similar track. Further, at each end of the girders are the crane legs, and the crane legs may similarly be integrated with a track along which the crane may move (perpendicular to the lateral motion of the hoist). In certain embodiments, instead of the crane legs being integrated with a track, the crane legs may be integrated with a wheel and tire system. These cranes are generally made operational by a combination of engines/motors for moving the hoisting devices and crane legs along their respective tracks, engines/motors for lowering and raising the hoist, and also control systems for managing, commanding, directing, and regulating the engines, motors, and other devices on the crane. Gantry cranes, and all cranes in general, vary in degrees of complexity and therefore some cranes include a plurality of auxiliary devices and supporting equipment on the crane.

In at least one embodiment, an exemplary system in accordance with the present disclosure includes a controller area network (CAN) bus controller (also referred to herein as the "industrial controller," "bus controller," or simply as the "controller") configured to receive CAN bus messages and data formatted according to multiple communication protocols.

In various embodiments, a CAN bus is a two-wire communication bus (including both a high and low wire/channel), where the physical states of the two wires are logically combined for generating a single serial signal. Generally, the International Organization for Standardization (ISO) defines the physical layer standards for CAN buses, for example, the ISO 11898 which specifies the electrical aspects of the physical layer (e.g., voltage, current, conductors, etc.). Certain industries have established and adopted specific protocols based on ISO physical layer standards, like the J1939 protocol discussed in more detail below, which is used primarily for industrial equipment.

A CAN bus connects two or more nodes, or electronic control units (ECUs), that are physically connected to both the high and low bus wires. A particular piece of equipment may include a plurality of ECU's, each of which may rely on data from another ECU for processing or executing its own data. In one embodiment, ECUs typically transmit sensor data over the CAN bus, and an ECU at a crane hoist may rely on sensor data from an ECU operatively connected to a piston on the crane (for example, the hoist may only become engaged if the piston is not actively engaged). As mentioned above, CAN buses include two transmission wires, a CAN high wire, and a CAN low wire. Each ECU is operatively connected to the CAN bus (and thus the high and low wires), and therefore all connected ECUs may receive transmissions from other ECUs and can determine whether to act upon the data transmissions or ignore them.

According to various aspects of the present disclosure, CAN bus data typically includes a series of binary bits (the series of bits is also referred to herein as a "frame"), and those bits represent hexadecimal binary data communicated between ECUs on the CAN bus. In one embodiment, the raw hexadecimal CAN messages may be transformed or decoded from their raw format into a human-readable and useable format via a vector data file referred to as a "DBC" file (an acronym for CAN database). In various embodiments, DBC files are used to identify CAN messages and translate the raw CAN data, as transmitted within a CAN frame, to meaningful values and meaningful information. In certain embodiments, a DBC file is an ASCII-based translation file used to apply identifying names, scaling calculations, offset calculations/operations, and defining information, to data transmitted within a CAN frame. In certain embodiments, DBC files may be configured based on the equipment being monitored and the types of CAN messages being transmitted by the equipment.

For example, the J1939 protocol is just one example of a CAN protocol and standard for which a DBC files may be generated. The J1939, or SAE J1939 protocol, is a CAN bus protocol developed by the Truck Bus Control and Communications Network Committee for standardizing the format in which diagnostic information is transmitted. While there is no DBC file specific to the J1939 protocol, the committee assigned various identifiers, names, numbers, and formats that are to be represented in a DBC file for the J1939 protocol. Other CAN bus protocols, such as the CANopen protocol, do not have an available assignment of identifiers, names, numbers, etc., from which to configure a DBC file, and therefore proprietary solutions for processing the CANopen messages may need to be developed. In various embodiments, CANopen was developed as a standardized embedded network with highly flexible configuration capabilities, and accordingly CANopen comprises higher-layer open systems interconnection (OSI) model profile specifications than the J1939 protocol. For example, the CANopen protocol allows for each device connected to the bus to be associated with a device/node profile defining its configuration, which may be defined in the OSI application layer. Furthermore, the CANopen protocol allows for various communication models to be implemented between the nodes connected to the bus, such as a master/slave model, a client/server model, and a consumer/producer model. According to various aspects of the present disclosure, each of these communication models allows for data from one or more nodes on the bus to be provided to one or more other nodes in a specific manner and based on their respective device profiles. In particular embodiments, the device profiles may also support multiple states (such as a master node changing or resetting the state of a slave node).

In various embodiments, the bus controller in the system discussed herein may be configured to receive data formatted in accordance with both the J1939 protocol and the CANopen protocol. For example, in one embodiment, the bus controller may receive J1939 messages from an engine operating at a gantry crane, and the bus controller may also receive CANopen messages from a hoist, piston, or a programmable logic controller (PLC) at a gantry crane. In at least one embodiment, the system may also be configured to receive data formatted in accordance with other CAN protocols not discussed in great length herein, such as OBD2 (on-board vehicle diagnostics based on ISO 15765) and CAN FD (CAN flexible data-rate), and it should be understood from the disclosure herein that the system is configured to process CAN frames of multiple different CAN bus protocols. According to various aspects of the present disclosure, being configured to receive and process messages formatted in accordance with two or more different types of CAN bus protocols provides a specific improvement over prior systems, which are typically only configured to process messages of a single CAN bus protocol.

According to various aspects of the present disclosure, the controller may be physically attached to the equipment from which it is receiving data (e.g., a gantry crane), the controller may be physically proximate to the equipment (e.g., at a base station nearby the gantry crane), or the controller may be positioned in a more remote location (e.g., in a server warehouse).

In various embodiments, at least one advantage and improvement over prior systems provided by the disclosed system is its ability to control the types of CAN data messages it receives (e.g., messages from certain nodes, messages communicating certain information, etc.), as well as the rate at which it receives CAN bus messages. In at least one embodiment, the controller is configured to execute predetermined masks or filters against CAN bus messages for controlling the CAN bus message types it receives. For example, a CAN bus message mask may only allow for certain predetermined message types to be received, while a CAN bus filter generally receives all message types but discards certain message types determined to be undesirable or unnecessary for subsequent processing. According to various aspects of the present disclosure, the system may control, or "throttle," the rate at which CAN bus messages are received at the industrial controller. In a particular embodiment, the system may control the rate at which CAN bus messages are received by dynamically adjusting a baud rate at the controller and/or a CAN bus message sample rate. As will be understood by one of ordinary skill in the art, a baud rate is generally the rate or speed at which information is transmitted over a communication channel (typically measured in bits per second). Further, a sample rate is generally the frequency at which data samples are taken, received, or retrieved, from a particular signal (typically, but not always, an analog signal). In at least one embodiment, a sample rate may also correspond to how frequently an entire CAN data frame is read from the bus I/O at the industrial controller (while many other CAN data frames may have been available to be read from the bus I/O but were not). In one embodiment, throttling the baud rate and/or sample rate provides an advantage over prior systems as it allows for the system to reduce the amount of redundant or superfluous data received, while still receiving the necessary information for diagnostic processing, therefore also reducing downstream storage and processing needs.

In at least one embodiment, the CAN bus controller is operatively connected to a cellular router for transmitting CAN bus messages from the CAN bus controller to a remote processing system. For example, the cellular router may be a MG90 multi-network vehicle router manufactured by Sierra Wireless, headquartered in Richmond, Canada. Other cellular routers or wireless transmitters with specifications similar to the MG90 router may also be configured to operate within the system. According to various aspects of the present disclosure, the CAN bus controller may be operatively connected to the MG90 router over a physical wired network connection (e.g., Ethernet, or the like), or the CAN bus controller may be configured to transmit the CAN bus messages to the router over a wireless network (e.g., Wi-Fi, Bluetooth, wireless local area networks, etc.). In other embodiments, the system may transmit the CAN bus messages to the remote processing system via a radio frequency (RF) transmitter, or other wireless receiving and transmitting (RX/TX) devices.

In a particular embodiment, the remote processing system includes one or more servers configured to receive, store, and process CAN bus data. For example, a receiving module (e.g., a wireless communications receiver or any appropriate RX/TX component) at the server may receive the CAN bus messages from the bus controller, and the server may store the CAN bus messages as-is in the raw data format in which the messages were received. In various embodiments, the system may then process the CAN bus messages by converting the messages from their raw data format (e.g., hexadecimal values) into a workable data format that can be understood by humans (for example, converting a hexadecimal value into engine revolutions per minute (RPMs)). In at least one embodiment, processing units at the server may process a CAN bus message in its raw data format by parsing the message and extracting certain hexadecimal portions of the message, and furthermore performing bitwise operations on the hexadecimal portions of the message to determine an associated value representative of a measurable aspect of the specific equipment from which the message originated. In various embodiments, the server may retain a copy of the CAN bus messages in their raw data format, in addition to the processed message data, for future processing.

In certain embodiments, the remote processing system performs diagnostics and other algorithmic processing on the CAN bus data for determining patterns, anomalies, or other discrete events within the data. Further, the remote processing system may simply track certain aspects of the processed CAN bus messages, for example, the run time of a specific engine operating at a gantry crane. Tracking these aspects or metrics allows for the system to predict, anticipate, and mitigate equipment failures and similar risks in the system. In some embodiments, the remote processing system may include a user-facing dashboard or graphical user interface platform for displaying the tracked equipment metrics to a user. Furthermore, the remote processing system may further be configured to automatically generate requests for repair, replacement parts, or general servicing, without any human interaction.

Exemplary Embodiments

Referring now to the figures, for the purposes of example and explanation of the fundamental processes and components of the disclosed systems, methods, and apparatuses, reference is made to FIG. 1, which illustrates an exemplary system environment 100, according to one aspect of the present disclosure. As shown in the present embodiment, the system environment 100 includes various locations in which the system may be implemented. Generally, the system may be implemented anywhere where a CAN bus is located, which is typically an industrial setting. As shown in the present embodiment, those locations at which the system may be implemented include a shipping yard or port 102, a rail yard 104, and an industrial vehicle or truck 106; however, many other locations and environments exist in which the system may be implemented. In one embodiment, the system implemented or installed at these various locations includes at least a CAN bus controller 108. As will be described in greater detail herein, the CAN bus controller 108 is a computing device operatively connected to, and configured to integrate with, multiple CAN buses. In at least one embodiment, the CAN bus controller 108 includes a CAN bus shield 110, where the CAN bus shield 110 is an integrated circuit with a plurality of input and output (I/O) pins or similar connectors, at which the CAN bus shield 110 can receive signals from connected CAN buses. In a particular embodiment, the CAN bus controller 108 further includes a central processing unit (CPU) 112 operatively connected to the CAN bus shield 110. According to various aspects of the present disclosure, the CPU 112 may run one or more software programs or algorithms that control the rate at which the CAN bus shield 110 receives and/or samples data from the multiple CAN buses, and the CPU 112 may also run one or more software programs or algorithms that determine which types of CAN messages to receive (and furthermore process) from the multiple buses. As will be discussed in more detail in association with the description of FIG. 2, the CAN bus controller 108 is a combination of hardware and software that is configured to physically integrate with multiple CAN buses, and furthermore throttle, regulate, and filter the data received from the multiple buses (thereby reducing the collection of unnecessary data) for improved processing.

Continuing with FIG. 1, and referring specifically to the shipping yard 102, the present embodiment illustrates two physical connections, connection 114A and 114B, to two CAN buses at one or more items of industrial equipment in the shipping yard 102. For the purposes of example and discussion, the industrial equipment in the shipping yard 102 is a crane for loading and unloading shipping containers from cargo ships. The connection 114A is a physical connection into a CAN bus at the crane that is operatively connected to an engine at the crane, such as a diesel engine that may provide the power for moving a shipping container along a rail or track. Furthermore, the connection 114B is a physical connection into another CAN bus separate and independent from the CAN bus into which the connection 114A connects. In various embodiments, the CAN bus connection 114B may connect, or "tie-into," an entirely separate CAN bus along which peripheral or auxiliary crane equipment, such as sensors at pistons, hoists, etc., may communicate. Thus, in the present embodiment, there may be two entirely separate and independent CAN buses at a single crane, and both CAN buses may be configured to use different protocols for transmitting messages across their respective CAN buses. The present systems, methods, and apparatuses, provide a specific improvement over prior systems in that the disclosed system allows for a single CAN bus controller to physically integrate with multiple independent (and generally incompatible) CAN buses operating according to different communication protocols. As will be discussed in greater detail below in association with the description of FIG. 2, while CAN buses all generally share some common physical characteristics, such as a high and low wire pair over which signals are transmitted, CAN buses may be configured according to different standards, or CAN messages may be transmitted using different protocols. At least two CAN bus messaging standards/protocols discussed herein include the SAE J1939 (or simply "J1939") standard/protocol and the CANopen standard/protocol. As will be understood by one of ordinary skill in the art, the J1939 protocol was developed for diagnostics on industrial vehicular equipment, such as diesel engines. Accordingly, the types of messages available to transmit using the J1939 protocol may correspond to components of vehicular equipment, like the engine, brakes, transmission, etc., that include microcontrollers for generating readings corresponding to the components. In particular, the J1939 protocol allows for messages relating to engine coolant temperature, engine oil pressure, engine speed, low fuel level, low battery voltage, engine over speed, etc., to be transmitted along the bus. The CANopen protocol, while still a CAN bus protocol, generally implements higher layers of the open systems interconnection (OSI) model stack than the J1939 protocol. For example, the CANopen protocol was developed for enhanced automation in industrial equipment, and therefore the protocol utilizes the application layer for communication between bus nodes (while the J1939 protocol does not).

According to various aspects of the present disclosure, the CAN bus controller 108 is configured to accommodate these different, and largely incompatible, CAN bus standards and protocols. For example, the ECUs or nodes connected to a J1939 CAN bus may continuously transit information, even if there has no material change (such as a state change) at the ECU/node. In one embodiment, the bus controller 108 is configured to throttle the sample rate at the CAN bus shield 110 to a rate that not only complies with the baud rate at which data is being transmitted over the bus, but also allows for the system to avoid oversampling data from the bus (a problem in conventional systems). Accordingly, in one embodiment, the bus controller 108 may sample the J1939 bus every ten seconds, instead of many times per second, in order to capture information about a diesel engine or similar item of industrial equipment.

In various embodiments, the bus controller 108 is configured to filter and/or mask CAN bus messages received at the CAN bus shield 110. For example, and according to various aspects of the present disclosure, the bus controller 108 may be configured to filter certain CAN bus messages received at the CAN bus shield 110 that include a certain predetermined or known identification number or address in the CAN message frame. In particular embodiments, these identification numbers or addresses may be represented as a series of bits included in a CAN bus message header or identifier, and those bits may correspond to a hexadecimal value indicative of the source component or device from which it was transmitted, the message type, etc. In at least one embodiment, the bus controller 108 may be configured to filter or mask all messages transmitted from a particular node/device, or the filters may be configured more granularly such that the messages are filtered based on the information being transmitted in the message (e.g., engine run time, voltage levels, oil temperatures, etc.), as identified by their respective hexadecimal values.

According to various aspects of the present disclosure, the bus controller 108 may also be configured to receive, and filter, CAN bus messages based on detected events or state changes. For example, the bus controller 108 may be configured to monitor CAN bus messages transmitted to the bus controller shield 110, but the controller 108 may only receive (read into computer memory) a message for further processing if the message indicates a certain event or change has occurred that the controller 108 should act upon. For example, the bus controller 108 may be configured to filter all CAN bus messages from a certain engine until the CAN bus messages indicate that the engine is now operating in reverse. In another embodiment, the bus controller may monitor CANopen message frames for a specific communication object identifier (COB-ID), or frame header, that indicates that the CANopen message includes instructions for changing another node's state. For example, the CANopen protocol includes a network management communication object (NMT), represented in particular embodiments as a 4-bit function code of all zeros located at the front of a COB-ID (e.g., "0000"), which is understood by the system as controlling either specific nodes, or all nodes, in the bus network (based on a node ID encoded into the message frame). According to various aspects of the present disclosure, an NMT-type message may change one or more device states to a pre-operational, operational, or stopped state based on NMT commands such as reset, start, and stop. In at least one embodiment, the system may monitor the multiple CAN buses at the bus controller shield to detect messages indicative of a state change at one or more devices (e.g., the messages include an NMT command), and furthermore receive (or read into memory) the specific CAN message for processing. In various embodiments, receiving CAN messages based on detected events, such as state changes, provides a technical improvement over prior systems because it allows for the system to identify exactly when a material change at the one or more devices occurs without continuously receiving and processing CAN messages from the devices. By implementing at least the CAN message throttling and filtering techniques discussed immediately above, the system may minimize (or at least reduce) redundant and unnecessary data collection and processing, resulting in overall improved network efficiency.

Continuing with the discussion of FIG. 1, the present embodiment also includes the rail yard 104 environment and the industrial vehicle environment 106. According to various aspects of the present disclosure, and similar to the shipping yard 102 operational environment 102, these environments include industrial equipment in which multiple CAN buses provide a communication medium along which the individual components of the equipment communicate and transmit diagnostics information. Similar to a crane at the shipping yard 102 environment, the rail yard 104 environment may also include a crane, such as a gantry crane, that includes two separate and independent CAN buses, as illustrated by the connections 116A and 116B. Furthermore, and as shown in the industrial vehicle environment 106 in which there are three separate and independent CAN bus connections 118A-C, the disclosed systems, methods, and apparatuses, may be integrated into industrial equipment environments that include multiple CAN buses, and it should be understood by the discussion herein that the disclosed systems, methods, and apparatuses are not to be limited to implementations of only two CAN buses.

According to various aspects of the present disclosure, the system also includes a remote processing system 120 operatively connected to the CAN bus controller 108 over a network 122. In one embodiment, the remote processing system 120 includes an architecture of processors and databases that are each operatively configured to perform specific processing tasks on received CAN bus messages. In a particular embodiment, the remote processing system 120 is configured to process CAN bus messages from their raw hexadecimal format into a useable and human-understandable format. In various embodiments, this may include leveraging predefined logic tables and conversion processes for parsing and extracting hexadecimal data arrays from CAN message frames, and furthermore performing bitwise operations on the hexadecimal data. In at least one embodiment, in response to processing the hexadecimal raw data into workable data, the remote processing system 120 may be further configured to detect data values from the processed CAN bus messages that are indicative of certain industrial equipment operating metrics (e.g., engine running time, torque measurements, etc.). In this way, the system may monitor the industrial equipment and determine appropriate diagnostic responses to any anomalies or detected events (e.g., engine failures, oil leaks, pressure declines, etc.). In certain embodiments, the system may also train machine learning algorithms and models (such as neural networks) with the CAN message data. In one embodiment, training a neural network with CAN message data may allow for the system to recognize and identify faults or anomalies in the industrial equipment in their early stages, thus allowing for the faults or anomalies to be addressed before becoming larger issues. Further, training a neural network with the CAN message data may allow for the neural network to predict when certain faults or failures may occur within the industrial equipment, thus resulting in improved preventative maintenance.

Figure 2:
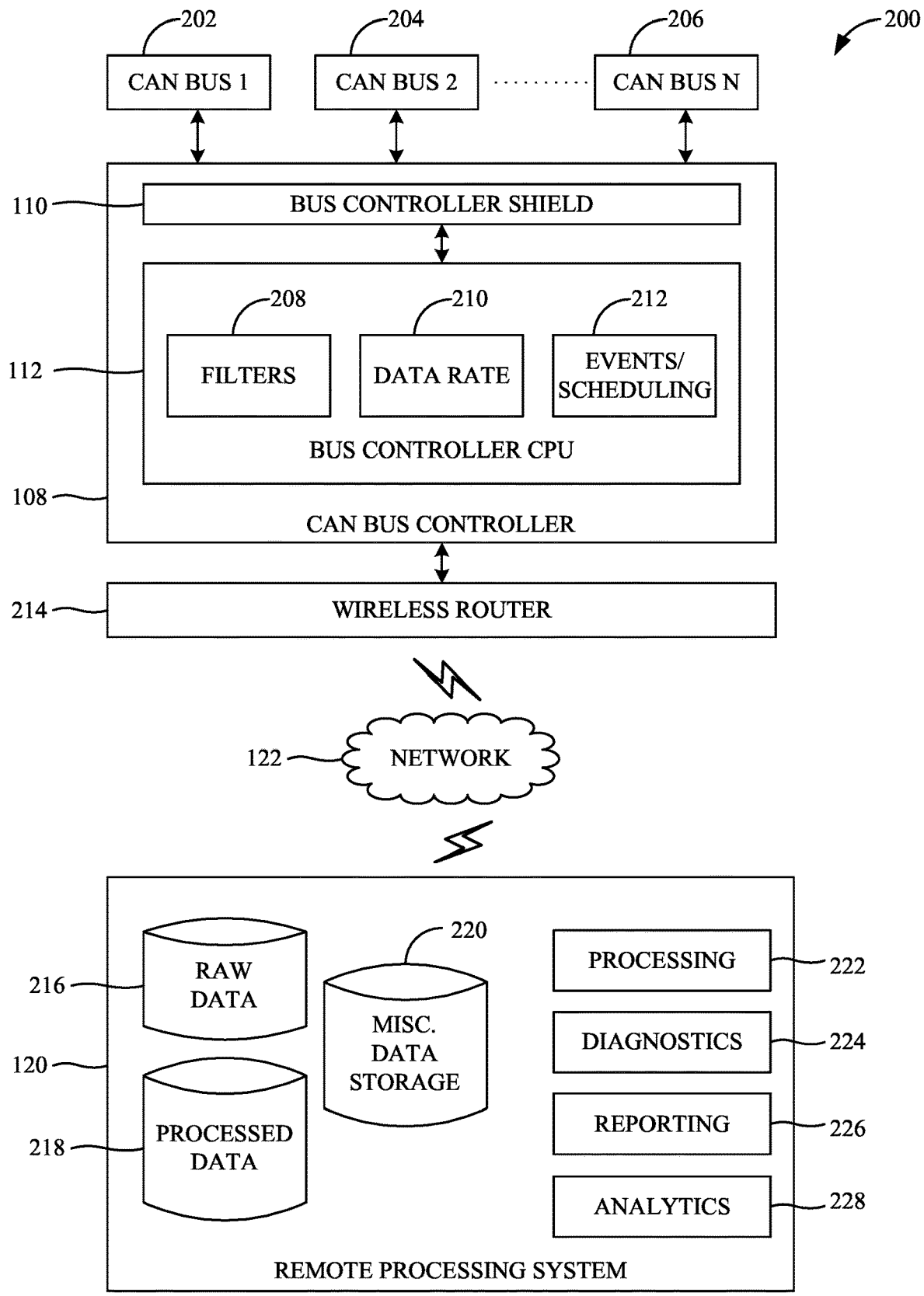
FIG. 2 is an exemplary system architecture, according to one aspect of the present disclosure.

In one embodiment, FIG. 2 is an exemplary system architecture 200, according to one aspect of the present disclosure. In a particular embodiment, an exemplary embodiment of the disclosed system may include the CAN bus controller 108, the bus controller shield 110, and the remote processing system 120, as discussed above in association with the discussion of FIG. 1. In various embodiments, an exemplary embodiment of the disclosed system may also include one or more wireless routers 214 configured to transmit CAN message data to the remote processing system 120.

As shown in the present embodiment, the exemplary system architecture 200 may include multiple CAN buses that are operatively connected to the CAN bus controller 108. Specifically, the present embodiment illustrates a CAN bus 1 (labeled with numerical callout 202), a CAN bus 2 (labeled with numerical callout 204), and a CAN bus N (labeled with numerical callout 206). According to various aspects of the present disclosure, each CAN bus operatively connected to the CAN bus controller 108 may physically connect to designated I/O pins, or an otherwise appropriate connector, at the bus controller shield 110. In at least one embodiment, the bus controller shield 110 may be a printed circuit board ("PCB") including a plurality of I/O pins at which multiple CAN buses may connect. Further, in a particular embodiment, the bus controller shield 110 may include a female or male connection for connecting to a reciprocal connector at the bus controller central processing unit ("CPU") 112. In particular embodiments, the bus controller CPU 112 may also be a PCB similar to the bus controller shield 110, and the bus controller CPU 112 may execute one or more software programs (e.g., scripts, algorithms, etc.) that perform various processing actions on received CAN bus message data. According to various aspects of the present disclosure, the bus controller CPU 112 may also include a graphical processing unit (GPU), for example, as GPU's may be more efficient at executing certain mathematical operations required for performing machine learning techniques.

In one embodiment, the bus controller CPU 112 may be operatively configured to execute a program or function including one or more filters 208, where the one or more filters allow for the bus controller CPU 112 to control which CAN bus messages are processed. As discussed above in association with the description of FIG. 1, the bus controller 108 may be configured to monitor CAN messages and detect specific message type indicators, destination or source node ID's, message types, etc., and furthermore either reject or accept the messages for subsequent processing.

In particular embodiments, the bus controller CPU 112 may be operatively configured to receive CAN bus data at a predetermined rate, as configured via the data rate processing function 210. According to various aspects of the present disclosure, each CAN bus connected to the bus controller 108 may transmit CAN message data according to predefined data transmission rates. For example, CAN buses configured to transmit J1939-formatted CAN messages may be configured to transmit data at 250 Kbps. Further, a J1939 message containing eight data bytes may take approximately 500 microseconds to transmit over the bus (depending on the specific number of bits actually transmitted). In certain embodiments, the sample rate at the CAN bus controller 108 may need to be synchronized with the CAN buses in order to ensure that data sampled/received (e.g., read into memory) from the buses is not received mid-transmission, which may result in an incomplete or incorrect data transmission. Thus, in various embodiments, the data rate processing function 210 includes computer implementable instructions to allow for the bus controller CPU 112 to configure a data sample rate that is synchronous with the corresponding bit rate (e.g., Kbps), or baud rate (to the extent that the baud rate and bit rate are not the same), at the connected buses.

In particular embodiments, and as mentioned immediately above, the data rate processing function 210 may also allow for the bus controller 108 to control the rate at which data is received for processing at the bus controller shield 110. Further, given a J1939 transmission may take only 500 microseconds to transmit, the volume of J1939 CAN bus messages received at a particular I/O connection could be in the hundreds, thousands, hundreds of thousands, or more (depending on the microcontroller operatively connected to the device, such as a diesel engine). Furthermore, at least on problem with traditional systems is the oversampling of CAN message data, as there may not be a material difference between the thousands of CAN bus messages received in the span of only a second, or few seconds. Therefore, not only is there no benefit to oversampling the data (given much of the data is redundant), but also the oversampling results in unnecessary use of processing resources. In at least one embodiment, the disclosed system solves this problem by a technical solution which includes configuring the bus controller CPU 112 to establish the rate, via the data rate function 210, at which the bus controller CPU 112 should sample CAN bus messages at the bus controller shield 110. For example, the data rate function 210 may be configured to instruct the bus controller CPU 112 to sample message data from a particular CAN bus received at the bus controller shield 110 every ten seconds. In various embodiments, sampling data from a particular CAN bus every ten seconds allows for receiving a data stream from which accurate diagnostics can be performed, without the system becoming overburdened with redundant data. In certain embodiments, and based on the configurations of the particular CAN bus being monitored, the sample rate may range from anywhere including ten samples per second, five samples per second, one sample per second, one sample every five seconds, one sample every ten seconds, one sample every minute, etc.

Continuing with the discussion of FIG. 2, the bus controller CPU 112 may also execute an events and scheduling function 212, according to one embodiment. In various embodiments, certain CAN bus protocols may support transmitting messages based on events that occur within the network of nodes connected to the bus. For example, the control systems at a crane may use the CANopen protocol for connecting each node/device at the crane to be on the same communication network (e.g., the CAN bus). Further, a particular device at the crane may rely on an update, state change, reading/measurement, or any appropriate status notification from another device before performing its configured operation. Therefore, nodes connected to this control systems CAN bus configured to support the CANopen protocol may transmit messages that include at least a transmission source node address, a destination node address, and also state or status information regarding the operations being performed at the source node. In at least one embodiment, the disclosed system may be configured to receive certain CAN bus messages that are formatted to include this type of event information for at least diagnostics reasons, and the system may be further configured to receive these CAN bus messages when a state change or event is indicated in the bus message. In various embodiments, a microcontroller at a crane piston may include, in a CAN bus message, that not only has the piston completed its instructed task of providing power for a crane arm, but also the piston microcontroller may also include metadata relating the pressure readings at the piston. According to various aspects of the present disclosure, over time the system may track the piston pressure metadata associated with certain events, like a state transition from "operational" to "stopped," to diagnose any issues or failures (such as pressure loss at the piston, hydraulic fluid leaks, etc.).

In particular embodiments, CAN bus messages collected from the multiple CAN buses (202, 204, and 206) at the CAN bus controller 108 may be transmitted in their raw data format via wireless router 214 to a remote processing system 120. In various embodiments, the wireless router 214 may be a cellular router like the MG90 multi-network vehicle router manufactured by Sierra Wireless, headquartered in Richmond, Canada. Other cellular routers with specifications similar to the MG90 may also be configured to operate within the system. According to various aspects of the present disclosure, the CAN bus controller 108 may be operatively connected to the router 214 over a physical wired network connection, or the CAN bus controller 108 may be configured to transmit the CAN bus messages to the router 214 over a wireless network (e.g., Wi-Fi, Bluetooth, wireless local area networks, etc.). In other embodiments, the system may transmit the CAN bus messages via a radio frequency (RF) transmitter, or other wireless receiving and transmitting (RX/TX) devices. In certain embodiments, the wireless router 214 may transmit the CAN bus messages in near-real time, as they are received from their respective CAN buses at the CAN bus controller 108, or the CAN bus messages may first be batched and then transmitted. For example, the CAN bus messages may be batched according to the particular CAN bus from which they were received, and the messages may be batched until a certain number of messages are received, or until a predetermined amount of time has passed. In certain embodiments, the wireless router 214 may include multiple communication channels over which CAN bus messages may be transmitted, thus allowing for the CAN bus messages from each of the multiple CAN buses connected to the controller 108 to be transmitted simultaneously and/or in parallel.

According to various aspects of the present disclosure, the CAN bus messages transmitted from the CAN bus controller 108, via the wireless router 214, to the remote processing system 120 may be initially stored in a raw data database 216 upon being received at the remote processing system 120. In various embodiments, the CAN bus messages in their raw data formats are generally unworkable until their respective hexadecimal byte arrays are processed; however, storing the raw data as originally received allows for the remote processing system 120 to retain a copy of the data for future additional processing or diagnostics, if needed. In one embodiment, the remote processing system 120 may also include a designated database (or a similar computer memory arrangement) for processed CAN message data, such as the processed data database 218. In various embodiments, the remote processing system 120 may also include one or more additional databases for miscellaneous data storage needs, as shown by the miscellaneous data storage database 220 in the present embodiment.

In response to receiving CAN messages in their raw data formats, the remote processing system 120 may execute its one or more processing functions 222 on the CAN messages. In one embodiment, the processing function(s) 222 at the remote processing system 120 may convert CAN message data from a raw format (e.g., hexadecimal format), into a workable format that is readable by a human and corresponds to a real-world expected value for the particular device (e.g., an engine runtime counter represented as a total number of hours). In particular embodiments, a real-world workable format may include the decimal numeral system for representing integers and non-integer numbers. For example, a decimal numeral notation of an engine runtime counter may be "12.61," which is understood by a human to represent that the engine has run for a total of 12.61 hours. In certain embodiments, a real-world format may also include values represented in scientific notation or another appropriate format based on the particular device to which it corresponds. According to various aspects of the present disclosure, processing the CAN message data may include executing a series of steps including parsing particular bytes from the message and performing bitwise calculations on the parsed bytes based on predetermined mapping logic. In certain embodiments, the predetermined mapping logic may map certain identifiers (e.g., COB-IDs) from the CAN message data to its corresponding device or node, and furthermore provide bitwise instructions for calculating a value or measurement based on the corresponding device/node and the other data encoded in the CAN message frame.

In various embodiments, the remote processing system 120 may perform one or more diagnostics functions 224 on the processed CAN bus message data. For example, in particular embodiments, the remote processing system 120 may calculate running averages of device component values, such as engine temperatures, and furthermore determine that certain engine components may need to be lubricated if the running average exceeds a predetermined acceptable temperature (as a lack of lubrication in the engine results in increased friction, and thus higher temperatures). In other embodiments, one or more diagnostics functions 224 may include monitoring how long it takes for a hoist to become fully raised from a previously lowered position, as an increase in time (above a certain expected or predetermined error threshold) may indicate power loss to the hoist. In general, the only limiting factor when determining the number of metrics and measureable readings from the CAN devices and nodes that may be logged for diagnostic processing is the number of devices and sensors and/or microcontrollers in those devices. According to various aspects of the present disclosure, and in response to a neural network being trained, via machine learning, with data sampled from the CAN buses, the neural network may automatically identify, without human intervention, one or more additional metrics or combinations of metrics to monitor based on a statistical relationship between the metric (or combination of metrics) and one or more faults, anomalies, or performance issues at the device.

In a particular embodiment, the remote processing system 120 may be configured to perform one or more reporting functions 226 on the processed CAN message data. According to various aspects of the present disclosure, the one or more reporting functions 226 may include generating alerts or notifications to a system administrator about faults, anomalies, or other performance issues detected in the processed CAN message data. In certain embodiments, the reporting functions 226 may be configured to generate order supply forms for receiving replacement parts to replace older device parts either determined to be nearing a replacement window, or that exhibit behavior suggesting a need for immediate replacement.

According to various aspects of the present disclosure, the remote processing system 120 may perform one or more analytics functions 228 on the processed CAN message data. In at least one embodiment, the analytics functions 228 are generally configured to generate insights, or predictions regarding future device performance, based on the processed CAN messages and any faults, anomalies, or performance issues detected in the CAN messages. In various embodiments, the one or more analytics functions 228 complement the one or more diagnostics functions 224 in that in response to the remote processing system 120 determining the source and cause of an issue in the CAN device network (via the diagnostics functions 224), the one or more analytics functions 228 in turn process all relevant CAN message data to determine and/or identify relationships between certain device issues and the other peripheral CAN device readings.

Figure 3:
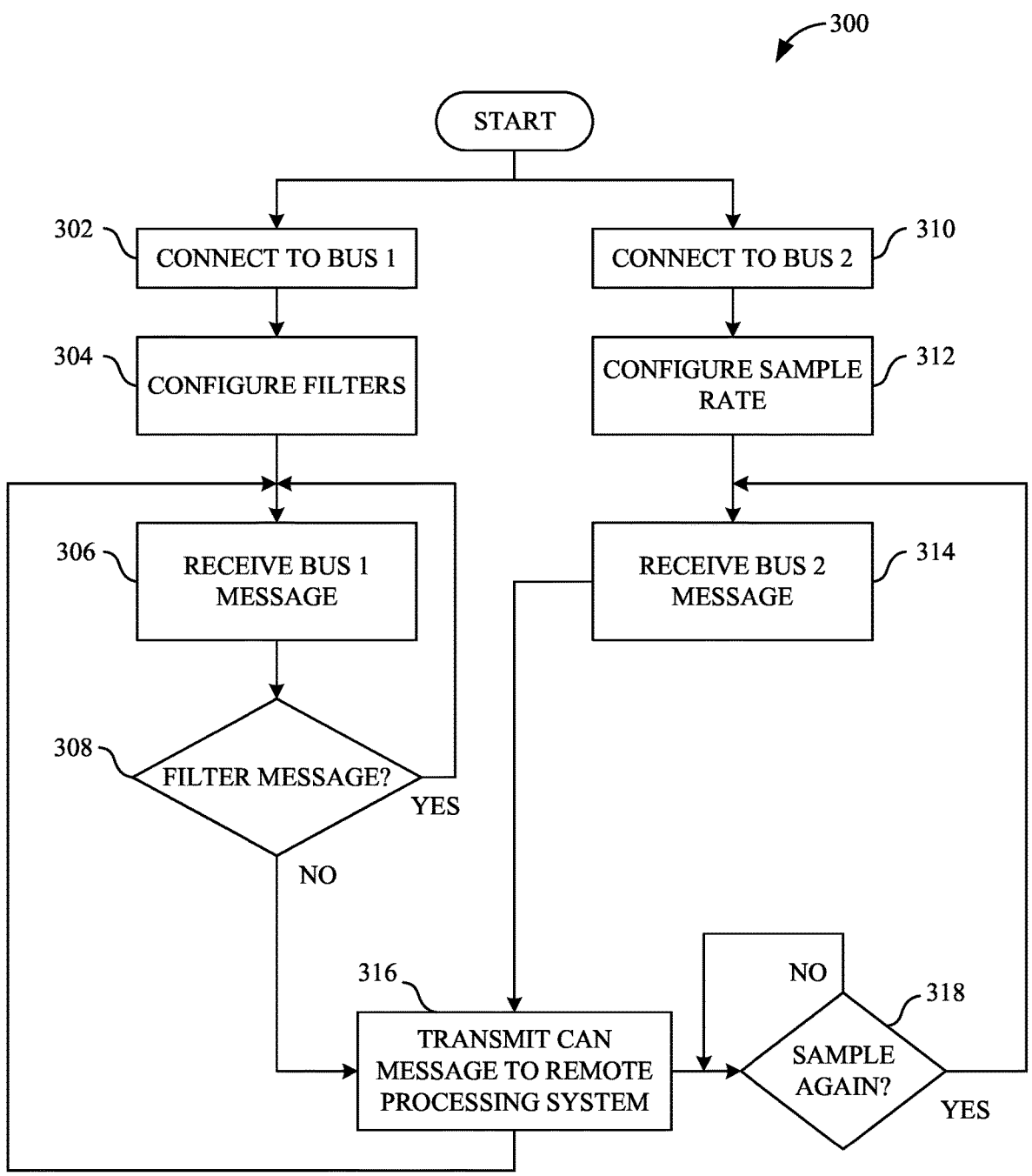
FIG. 3 is a flowchart of an exemplary multi-bus data receiving process, according to one aspect of the present disclosure.

Now turning to FIG. 3, a flowchart of an exemplary multi-bus data receiving process 300 is shown, according to one aspect of the present disclosure. As discussed throughout the present disclosure, a bus controller 108 may be operatively connected to multiple CAN buses (such as the CAN buses 202, 204, and 206), and the bus controller 108 may furthermore receive messages from devices, or nodes, connected to those buses. The present embodiment illustrates a process by which the system receives CAN bus messages from two separate (and generally incompatible) CAN buses, and furthermore transmits the received messages to a remote processing system for subsequent processing, diagnostics, analytics, etc.

In one embodiment, the process 300 begins at step 302, where the system (e.g., the bus controller 108) connects to a first CAN bus, or "bus 1" as referred to in the present embodiment. In various embodiments, bus 1 may connect to the bus controller 108 via a CAN bus shield (bus controller shield 110). As discussed above in association with the description of FIG. 2, the bus controller shield 110 includes a plurality of I/O pins, or I/O connectors, that provide physical connections at which the multiple CAN buses can connect. In certain embodiments, the I/O pins are arranged in such a way that the I/O pins at the bus controller shield 110 may connect to (with or without an additional attachment, converter, dongle, etc.) a specific connector head, such as a J1939 9-pin connector head. In a particular embodiment, in response to connecting bus 1 to the bus controller at step 302, the system may begin receiving CAN messages from bus 1.

In various embodiments, at step 304, the system configures one or more filters, or masks, to apply to received CAN messages, via one or more scripts or algorithms being executed on a processor local to where the CAN messages are being received. In certain embodiments, the filters configured at step 304 may determine if the received CAN messages are "whitelisted" or "blacklisted." For example, the system may be configured to execute a filter that identifies certain metadata in CAN messages indicative of message characteristics or message types that are predetermined as being superfluous, or generally not needed for subsequent processing. In this way, by filtering certain CAN bus messages, the system may "blacklist" certain CAN bus message types, messages transmitted from certain nodes or devices on the bus, messages transmitted to certain nodes or devices on the bus, etc., as the predetermined criteria or message types disallow them from being processed after being received at the bus controller shield 110.

Continuing with step 304, the system may also regulate the receiving and processing of CAN messages by configuring one or more masks to be applied to the received CAN messages. In at least one embodiment, applying a mask to the CAN bus messages is similar to a filter in that it dictates the allowable messages to be received and read into computer memory for subsequent processing; however, the mask allows for only certain predetermined messages or messages types to be received at the CAN bus shield 110, while all other messages are disallowed. Put another way, while a filter scans CAN messages for data to exclude from processing, a mask scans CAN messages for data to include in processing.

In at least one embodiment, and continuing with step 304, the system may configure filters that include or exclude received CAN messages from processing based on events indicated within the CAN messages. For example, certain CAN protocols such as the CANopen protocol support message frames that include OSI model application layer data, like device profiles device states. In various embodiments, the CANopen devices transmitting a message might include a change in its own state (e.g., pre-operational, operational, stopped, etc.), or the message might include a command for another device in the network (over which the transmitting device has some control or operational influence) to change its state. According to various aspects of the present disclosure, at step 304, the system may configure filters that include or exclude CAN messages based on if the messages include data indicative of a device state change. In particular embodiments, filtering CAN messages (or selectively receiving CAN messages) based on indications of state changes allows for the system to avoid oversampling redundant messages while still receiving all material and relevant messages associated with changes in the bus network.

At step 306, according to one embodiment, the system receives a bus 1 CAN message. According to various aspects of the present disclosure, the CAN message is received at the bus controller shield 110, and more specifically at the I/O connector(s) physically tied-into the CAN bus 1. In particular embodiments, the CAN message is received as raw data, or a series of bits corresponding to hexadecimal values, that is generally unworkable in its received state (aside from certain processes like identifying known identifiers in the message headers).

In various embodiments, the process 300 may proceed to step 308, to determine if the system should exclude or include the CAN message received at step 306 from processing. In particular embodiments, and as mentioned throughout the present disclosure, the system may include predetermined lists of source node addresses (e.g., the device transmitting a CAN message), destination node addresses (e.g., the device to receive a CAN message), parameter group numbers (PGN's) that correspond to particular device characteristics, function codes indicative of a message type configured to managing other nodes in the bus network, etc., each of which may be represented in a predetermined filter list as bit strings or a hexadecimal values known to correspond to CAN messages to be excluded from processing. In at least one embodiment, and in CAN bus configurations based on the J1939 protocol, a CAN message may be transmitted with a PGN that includes an 18-bit identifier, or a 29-bit identifier referred to as a CAN ID that generally includes a PGN with additional bits for metadata such as a priority level and a source address. In additional embodiments, the system may also filter CAN bus messages based on suspect parameter numbers (SPN's) that can be identified within, and extracted from, the data bytes transmitted in the CAN message. Accordingly, at step 308, the system compares the predetermined filter list to the received bus message to determine if the received bus message includes any of the listed bit strings or hexadecimal values (at their expected locations in the CAN message frame).

If, at step 308, the system determines the CAN message received at step 306 includes a filter list item and thus should be excluded from processing, the process 300 may return to step 306 to receive further bus messages. If, at step 308, the system determines the CAN message should not be excluded from processing, the process 300 may proceed to step 316, which includes transmitting the CAN message to the remote processing system 120 (discussed in greater detail below in association with the description of FIG. 4).

In one embodiment, the process 300 may proceed now to step 310, where the system connects to a second CAN bus, or "bus 2" as referred to in the present embodiment, which is a separate CAN bus of a different protocol than that of bus 1. According to various aspects of the present disclosure, it should be understood that the steps in the process 300 associated with bus 2 (steps 310-318) may execute simultaneously to, and concurrently with, the steps associated with bus 1 (302-308, and 316). For example, the step 310, which includes bus 2 connecting to the bus controller 108 via the bus controller shield 110, may execute at the same time as step 302.

In various embodiments, in response to connecting bus 2 to the bus controller 108 at step 310, the system may configure the data sample rate at step 312. In one embodiment, configuring the data sample rate at step 312 includes establishing a rate, or frequency, at which CAN messages are to be received at the bus controller shield 110. For example, and as described above in association with the description of the data rate function 210 shown in FIG. 2, the system may configure the rate at which CAN messages are sampled, or received, from a particular CAN bus. For example, the system may be configured to sample CAN message data from bus 2 every ten seconds. According to various aspects of the present disclosure, without configuring a sample rate at the step 312, the system would receive an amount of CAN messages that not only would be grossly redundant (given the large number of CAN messages transmitted per second), but also would be overly burdensome and computationally expensive to process. Therefore, at step 312, the system configures a sample rate, such as every ten seconds or another appropriate rate, according to which the system will receive CAN message data from bus 2.

In one embodiment, and at step 314, the system receives the CAN message data from bus 2. In various embodiments, receiving the bus 2 CAN message is largely the same processing step as, or is at least substantially similar to, the step 306 which includes receiving the bus 1 CAN message. According to various aspects of the present disclosure, receiving the bus 2 CAN message may include pulling the CAN message off the bus (e.g., detecting and reading the physical high and low analog values on the bus corresponding to binary bits) and furthermore reading (e.g., storing) the message data into memory for subsequent processing steps. In particular embodiments, and while not discussed in detail with respect to receiving CAN messages from bus 2, the bus 2 message may also be filtered according to a processing step like the step 308.

Continuing with the discussion of FIG. 3, and in response to receiving the bus 2 CAN message at step 314, the process 300 proceeds to step 316, where the system transmits the bus 2 CAN message to the remote processing system. In various embodiments, and in response to transmitting CAN messages from both bus 1 and bus 2 to the remote processing system at step 316, the system returns back to prior steps in the process 300 for receiving new CAN messages from the connected buses. In at least one embodiment, the system may return back to step 306, where a new CAN message is received from bus 1. However, prior to returning back to step 314 to receive a new CAN message from bus 2, the system first determines at step 318 if receiving a new CAN message would be premature based on the sample rate configured at step 312. According to various aspects of the present disclosure, at step 318, if the sample rate configured at step 312 was established to be receiving one CAN message from bus 2 every thirty seconds, the bus 2 arm of the process 300 may likely remain at step 318 until enough time has elapsed (likely just less than thirty seconds) to allow a new CAN message to be received at bus 2 in accordance with the sample rate configured at step 312.

Figure 4:
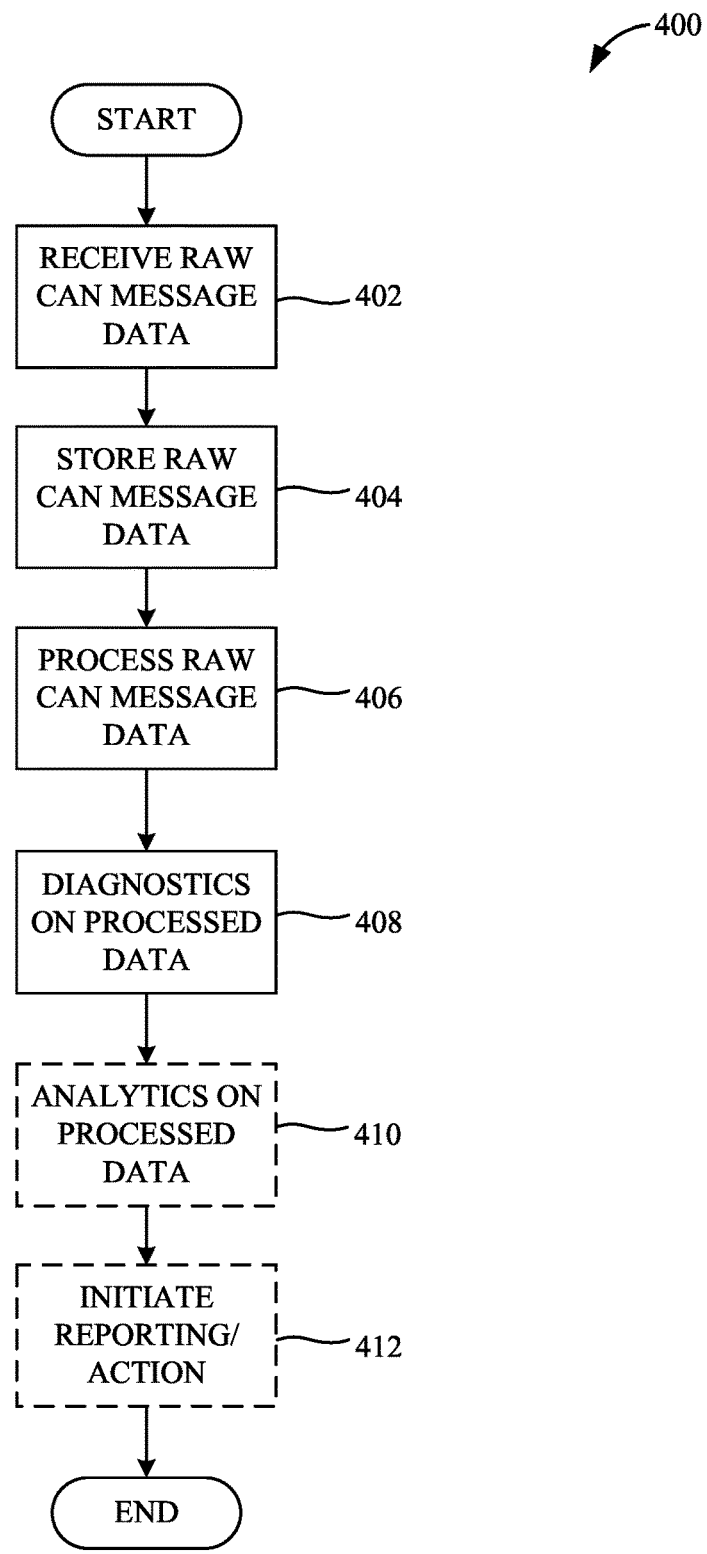
FIG. 4 is a flowchart of an exemplary remote CAN bus data processing process, according to one aspect of the present disclosure.

Turning now to FIG. 4, a flowchart of an exemplary remote data processing process 400 is shown, according to one aspect of the present disclosure. In various embodiments, and as discussed throughout the present disclosure, CAN messages received from multiple CAN buses at a bus controller 108 may be transmitted to a remote processing system 120 for processing. In at least one embodiment, the process 400 begins at step 402, where the remote processing system 120 receives raw CAN message data from the bus controller 108 (via the router 214). According to various aspects of the present disclosure, the remote processing system 120 may include a wireless receiver and transmitter component for receiving the CAN message data from the bus controller 108. In a particular embodiment, the CAN message data received at the remote processing system is received in a raw format, such that the data is formatted in its original hexadecimal representations and is generally unworkable prior to processing. While certain portions of the raw CAN data may be identifiable without processing the data, such as a hexadecimal PGN known to correspond to a certain engine controller, the CAN data is generally unworkable until processed.

At step 404, and in various embodiments, the remote processing system stores the raw CAN message data in a database at the remote processing system 120. In one embodiment, the remote processing system stores the raw CAN message data in a specific database designated for the raw CAN message data (e.g., the database 216) and separate from other stored data, such as already-processed CAN message data. In certain embodiments, storing the raw CAN message data separately from other data at the remote processing system allows for the raw CAN message data to be preserved in its original format for future processing and diagnostics.

Proceeding now to step 406, in one embodiment, the remote processing system 120 processes the raw CAN message data. According to various aspects of the present disclosure, processing a raw CAN message generally includes parsing the CAN message bit frame and extracting hexadecimal bytes from specific portions of the CAN message frame. In particular embodiments, how each CAN message is processed depends on the particular protocol governing the CAN message transmission. However, each CAN message is generally processed according to predetermined scaling parameters (also known as conversion rules) that are specific to the devices or nodes transmitting messages over the bus. For example, given a CAN message transmitted from an engine, a specific scaling parameter and conversion rule defines the bitwise operations to perform on the hexadecimal representation of the engine speed (or revolutions per minute) in order to convert the hexadecimal representation into a standard binary representation or real-world engine speed understandable by a human. According to various aspects of the present disclosure, these scaling parameters and conversion rules may be provided by device manufacturers in a file format referred to as a ".DBC" file. In other embodiments, when scaling parameters and conversion rules are not provided or publicly available, the conversion rules may need to be discovered via reverse engineering tactics, such as monitoring the CAN bus for patterns in the CAN messages and resulting observable device behaviors.

Proceeding now to step 408, in one embodiment, the remote processing system performs diagnostics on the processed CAN message data. According to various aspects of the present disclosure, performing diagnostics on the processed CAN data may include storing the processed data and determining if the processed CAN messages include data indicative of a device/node failure, need for repair, etc. In one embodiment, the system may be configured to monitor a runtime counter for one or more engines operatively connected to a CAN bus tied into the bus controller 108. In various embodiments, monitoring the runtime of each engine allows for the system to track historical engine use, which may be useful for scheduling maintenance on the engine. Thus, in particular embodiments, performing diagnostics on the processed CAN message data may include determining if CAN messages received from a particular engine indicate that the engine runtime has exceed a predetermined value (e.g., 1000 hours). Similarly, in various embodiments, the system may perform diagnostics by monitoring the engine temperature, throttle position, etc., each of which may be compared to predetermined expected values or thresholds for determining if the engine is experiencing an operational issue.

In various embodiments, step 410 may be an optional step in the process 400, which includes performing analytics on the processed CAN message data. According to various aspects of the present disclosure, performing analytics on the processed CAN message data may include executing statistical analyses on the processed CAN data for predicting the likelihood of certain faults or issues appearing in the industrial equipment before they actually occur. For example, in one embodiment, the remote processing system may monitor how long a particular component at a crane (such as a piston, gearbox, hoist, etc.) remains in an actively engaged state while performing a routine task. Continuing with this example, the remote processing system may maintain a running average of the total time spent to perform the routine task (based on timestamps extracted from historical CAN messages), and if the running average beings to increase more than expected, or if one or more new times are determined to be outside of an expected range or variance (e.g., 2%, 5%, 10%, 25% outside an expected variance threshold), the remote processing system may determine that a fault is occurring or developing at that particular crane. According to various aspects of the present disclosure, given devices and nodes on a CAN bus communicate not only globally on the bus (transmitting messages intended for all nodes/devices), but also locally (transmitting messages intended for one or more specific nodes/devices), performing analytics on certain aspects of device characteristics allows for the remote processing system to better identify which device/node connected to the CAN bus is actually experiencing the fault or issue (given an issue observed at one device may be a direct result of an issue being experienced at another upstream device).

Continuing with step 410, performing analytics on the processed CAN message data may allow for the remote processing system to identify one or more message types that may be filtered. Referring back to the discussion of FIG. 2, and particularly the discussion of the filters function 208, the remote processing system 120 may determine that a specific CAN message may not be required for processing, and therefore that CAN message should be filtered and excluded from subsequent processing. In various embodiments, the remote processing system may automatically generate and implement this filter based on the analytics performed at step 410, or the remote processing system may maintain a log of recommended actions based on the analytics and notify a system administrator about the recommended filter. In various embodiments, the analytics performed at step 410 may be supported by machine learning algorithms and techniques. According to various aspects of the present disclosure, one or more machine learning algorithms, such as neural networks, may be trained using data collected from the multiple CAN buses.

Proceeding now to step 412, in one embodiment, the system may perform reporting or other actions based on the diagnostics performed at step 408, and/or based on the analytics performed at step 410. In various embodiments, step 412 is an optional step in the process 400, but the remote processing system may be configured to execute reporting or actions at this step for improving the efficiency of the system overall. For example, in response to detecting a fault in a particular component at a crane on a rail yard, the remote processing system may automatically perform certain actions such as alerting a maintenance team of the detected fault, submitting an order request for one or more replacement parts known to be required for the detected fault, alert an expected delivery (e.g., a train, truck, etc.) to be routed to a different location on the rail yard because the previously assigned crane may be under repair when the delivery is scheduled to arrive, etc.

Figure 5:
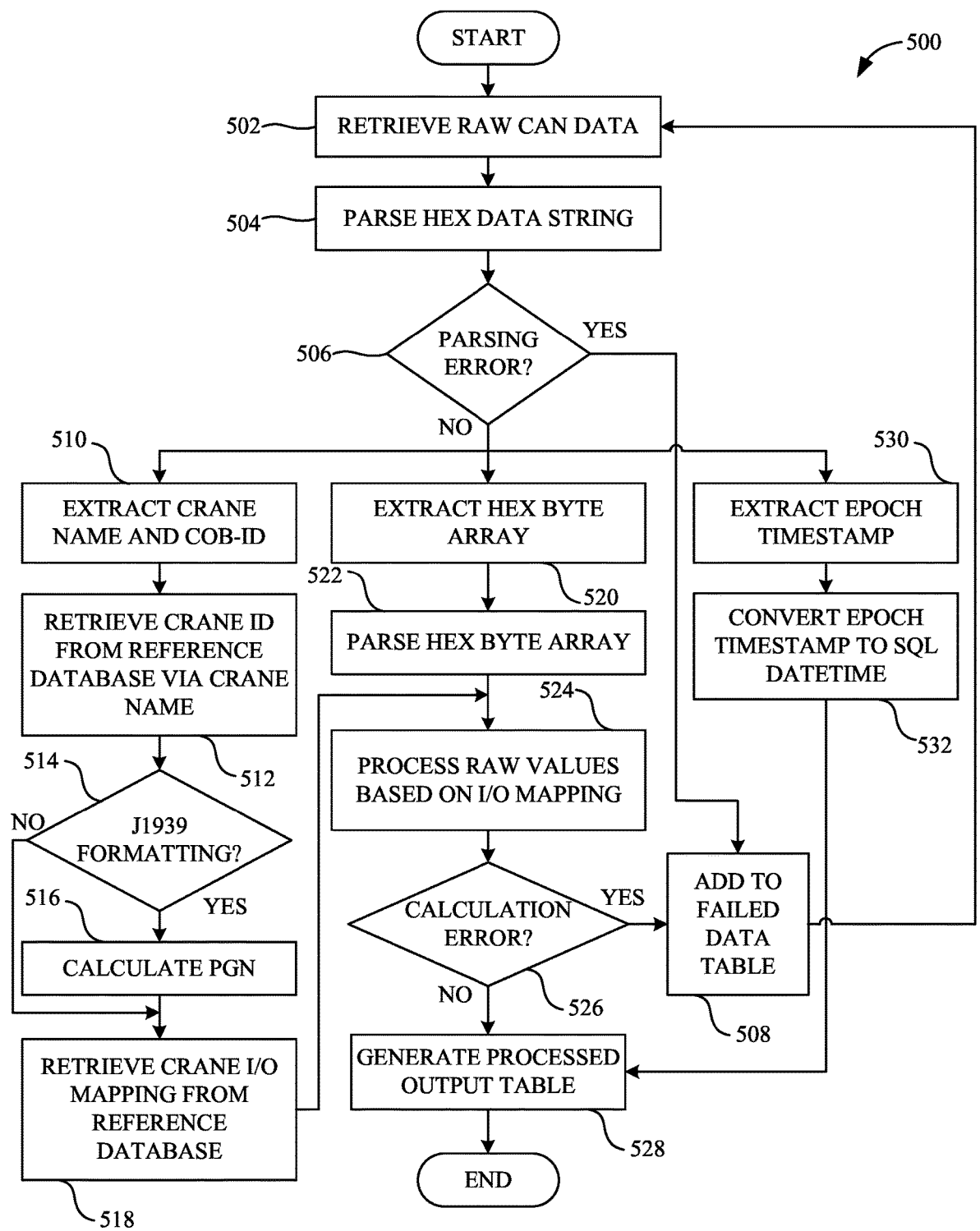
FIG. 5 is a flowchart of an exemplary raw CAN data processing process, according to one aspect of the present disclosure.

Proceeding now to FIG. 5, a flowchart process 500 is shown in which raw CAN message frames (e.g., CAN data) are processed into workable data according to one aspect of the present disclosure. As will be understood from the following discussion of FIG. 5, the process 500 includes steps for processing raw CAN data received from industrial equipment and control systems at a crane; however, it should be understood from the discussion herein that the same or similar processing steps may apply to other types of industrial equipment and control systems not presently described.

According to various aspects of the present disclosure, the process 500 begins at step 502, where a processor at the remote processing system 120 retrieves raw CAN message data from the raw data database 216. In some embodiments, the remote processing system 120 may receive the raw CAN message data directly from the industrial equipment from which it was transmitted (without first being stored in the raw data database). In various embodiments, retrieving the raw data includes querying the raw data database 216 for one or more CAN message frames received from one or more pieces of industrial equipment.

In certain embodiments, at step 504, the processor at the remote system parses the hexadecimal data string that is the raw CAN message frame. As will be understood by one of ordinary skill in the art, CAN messages are transmitted in a hexadecimal format, which is a base-16 representation of binary decimal formatting. Whereas an ordinary binary representation may be a single bit—either a 1 or a 0—a hexadecimal binary representation may be represented as a single character corresponding to a 4-bit binary sequence. According to various aspects of the present disclosure, each CAN message (regardless of its associated protocol) may include one or more identifying bytes or bit combinations in a beginning portion of the CAN message frame (e.g., a header, a COB-ID, any other appropriate identifying bit sequence, etc.). In at least one embodiment, these bytes or combination of bits generally allow for a data processor to determine identifiable characteristics of the CAN message, and if the CAN message is a valid message.

At step 506, in various embodiments, the processor determines if there was a parsing error resulting from step 504. In one embodiment, there may be a parsing error if the CAN message was determined to be an incomplete message frame (e.g., not all expected bytes were received), and thus the message cannot be completed. In particular embodiments, parsing errors may be the result of sampling data at rates that are not synchronous with the baud rate or bit rate at the CAN bus. If, at step 506, the processor determines that a parsing error occurred, the process 500 may proceed to step 508, where the processor adds the hexadecimal data to a failed data table, or a separate database for the hexadecimal data resulting in the parsing error. According to various aspects of the present disclosure, adding the hexadecimal data resulting in the parsing error to a separate data table or database not only isolates the data to prevent it from causing future processing errors, but also allows for the data to be evaluated for determining the cause of the parsing error (as this may indicate an error with one or more devices tied into the CAN bus). In various embodiments, if no parsing errors occur at step 506, the process 500 may proceeds to the steps 510, 520, and 530. According to various aspects of the present disclosure, each of the steps 510, 520, and 530, correspond to processing certain portions of the parsed hexadecimal data from the raw CAN message data. In at least one embodiment, these processing steps may be processed simultaneously and concurrently. In other embodiments, these processing steps 510, 520, and 530 (and their respective subsequent steps) may be processed sequentially.

In one embodiment, at step 510, the processor extracts a crane name (which may be a predetermined name or identification number assigned to the crane by a system administrator or manufacturer), as well as what is known as a communication object identifier (COB-ID), from the parsed hexadecimal data string. In particular embodiments, the COB-ID is generally an 11-bit identifier split into two sections—a 4-bit function code, and a 7-bit node identifier. In various embodiments, the combination of crane name and COB-ID may allow for the specific crane and/or component on the crane to be identified, and furthermore for conversion logic to be identified for translating the raw CAN message data to a workable data format. In various embodiments, at step 512 the processor uses the crane name to locate a corresponding crane identifier, identification number, or simply "crane ID," from a reference database (such as a crane inventory reference table).

According to various aspects of the present disclosure, at step 514 the processor determines if the raw CAN message currently being processed is formatted according to the J1939 protocol. In particular embodiments, the steps for parsing, extracting, and processing raw CAN message data of different protocols are substantially similar, but for some differences rooted in the uniqueness of their respective bit frames. In one embodiment, the step 514 accounts for these differences by determining if the raw CAN message currently being processed is formatted according to the J1939 protocol. If, at step 514, it is determined that the CAN message is in fact a J1939 CAN message, the process 500 may proceed to the step 516 where the processor determines a corresponding PGN (parameter group number). In one embodiment, at step 514 the PGN is calculated based on the COB-ID extracted from the hexadecimal data string. In various embodiments, each PGN is a predetermined 18-bit identifier corresponding to a specific component of a larger item of industrial equipment. In at least one embodiment, the remote processing system may perform a bitwise operation (predetermined by the J1939 protocol) on the COB-ID for translating the COB-ID into its corresponding PGN. In at least one embodiment, and in response to determining the PGN, the system may be further configured to identify one or more suspect parameter numbers, or SPNs, based on the PGN. In particular embodiments, SPNs may further define specific signals transmitted in the CAN message. For example, a PGN determined to correspond to a particular engine may include, or be associated with, one or more SPNs that correspond to the engine speed.

However, at step 514, if it was determined at the raw CAN message is not formatted according to the J1939 protocol and is instead a CANopen message frame, the processor may skip the step 516 (as CANopen frames do not include PGN's given their specificity to the J1939 protocol) and instead proceed directly to the step 518.

In various embodiments, at step 518, the processor retrieves crane I/O mapping from a reference table. In one embodiment, the I/O mapping may be retrieved using the PGN determined from step 514, or in cases where the CAN message is a CANopen bit frame, the crane I/O mapping may be retrieved from the reference database using the crane ID from step 512 and the COB-ID from step 510. In one embodiment, the crane I/O mapping reference table may be the same reference table used to determine the crane ID at step 512, or in some embodiments the reference table may be different. According to various aspects of the present disclosure, the crane I/O mapping reference table may include predetermined logic specific to the CAN message's governing protocol. In at least one embodiment, where the CAN message is a J1939 CAN message, the crane I/O mapping reference table may be a "DBC" file, which is a database file including computer implementable instructions for determining PGNs and SPNs from CAN bus message frames, as well as computer implementable instructions for converting raw J1939 data into a human readable format.

Proceeding now to step 520, the processor may extract the hexadecimal byte array from the raw CAN message data. According to various aspects of the present disclosure, the hexadecimal byte array in both J1939 frames and CANopen frames may include the actual substantive content of the CAN message. For example, in one embodiment, a J1939 byte array may include the SPN's corresponding to the PGN identified in the CAN frame identifier. According to various aspects of the present disclosure, and based on the CAN message's specific protocol, the remote processing system may extract the hexadecimal byte array by extracting specific bytes (or bits) from the message frame known to be located at specific byte/bit locations in the message frame. For example, the first bit of the byte array may be located immediately after an initial 29 bit identifier in the CAN message frame, and therefore bit number 30 in the frame is known to include the first bit of the byte array. Accordingly, in particular embodiments, the remote processing system may locate and extract specific bits and/or bytes in the message frame based on their location relative to other bits/bytes in the frame sequence.

At step 522, in various embodiments, the processor parses the hexadecimal byte array extracted at step 520. As mentioned immediately above, the byte array generally includes 8 bytes (64 bits), and the processor may extract specific bytes known to include CAN message data. According to various aspects of the present disclosure, parsing may include sequentially locating and identifying each bit/byte in the array and furthermore returning the bit/byte for processing.

In a particular embodiment, at step 524, the system uses the crane I/O mapping from step 518 to processes the raw hexadecimal values extracted and parsed from the byte array (at steps 520 and 522) to determine their corresponding real-world values. According to various aspects of the present disclosure, step 524 executes as a result of the combination outputs from step 522 and step 518. For example, at step 518, the remote processing system retrieves the crane I/O mapping which determines how hexadecimal values corresponding to specific crane components are to be translated into a workable and "real-world" format. Further, at step 522, the remote processing system determines the hexadecimal values (the byte array) to be translated according to the I/O mapping retrieved at step 518. Thus, in various embodiments, step 524 includes processing the raw CAN data to calculate the real-world values corresponding to specific crane components, where calculating the real-world values includes performing bitwise operations such as scaling and offsetting on the raw data.

At step 526, in particular embodiments, the processor determines if a calculation error occurred as a result of the processing from step 524. In at least one embodiment, a calculation error may be determined to exist if the resulting value is not an expected value for the particular crane component (e.g., a negative engine RPM measurement). If a calculation error is identified at step 526, the erroneous data may be added the failed data table at 508 (and concatenated with the erroneous data from step 506), and the process 500 may then proceed back to step 502 for retrieving additional raw CAN message data to process. However, at step 526, if it is determined that there was no calculation error, the process may proceed to the step 528 where the processor generates a processed data output table which includes at least the real-world values corresponding to the processed byte array from step 524, the crane ID from step 512, and data such as an item ID from the crane I/O mapping.

In various embodiments, the processed data output table generated at step 528 may also include a timestamp corresponding to each item in the table. In one embodiment, at step 530, the processor extracts an epoch timestamp from the raw CAN message data for subsequent processing. According to various aspects of the present disclosure, CAN message timestamps are processed at least for subsequent diagnostics and analytics purposed. For example, knowing at what time specific equipment behavior was detected may allow for improved diagnostics, fast reporting regarding the identified equipment behavior, and more precise analytics corresponding to the identified behavior. In a particular embodiment, CAN message timestamps may also be used for tracking equipment metrics such as engine runtime, which allows for the system to better determine appropriate maintenance schedules.

According to various aspects of the present disclosure, at step 532, the processor converts the epoch timestamp extracted from the CAN message at step 530 into an SQL server timestamp. In at least one embodiment, the processor furthermore immediately proceeds to add the SQL server timestamp into the output table at step 528. In at least one embodiment, the epoch timestamp may represent the time as a specific number of seconds having passed since a prior known date. Despite epoch time's simplicity of expressing time as a single number, this number is generally not understood by humans without undue calculations. Accordingly, at step 532, the system converts the epoch timestamp into an SQL server compliant timestamp. In one embodiment, given the relational nature and organizational structure of SQL databases, dates and times are generally represented in SQL as including at least a day, month, and year, and sometimes also an hour, minute, second, etc. Therefore, in various embodiments, converting the epoch timestamp to an SQL timestamp allows for the timestamp data to be included in the processed output table generated at step 528, and furthermore used in subsequent processing.

CONCLUSION

From the foregoing, it can be understood that various aspects of the processes described herein can be software processes that execute on computer systems that form parts of the system. Accordingly, it can be understood that various embodiments of the system described herein can be generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information may be transferred or provided over a network or another communications connection (either hardwired, wireless, or a combination of hardwired or wireless) to a computer, the computer properly views the connection as a computer-readable medium. Thus, any such connection may be properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art can understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules can be often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art can also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system can be practiced in distributed computing environments where tasks can be performed by local and remote processing devices that can be linked (either by hardwired links, wireless links, or by a combination of hardwired or wireless links) through a communications network. In a distributed computing environment, program modules may be located in both local and remote memory storage devices.

An exemplary system for implementing various aspects of the described operations, which may be not illustrated, includes a computing device including a processing unit, a system memory, and a system bus that couples various system components including the system memory to the processing unit. The computer can typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as may be known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices can be often connected to the processing unit through known electrical, optical, or wireless connections.

The computer that effects many aspects of the described processes can typically operate in a networked environment using logical connections to one or more remote computers or data sources, which can be described further below. Remote computers may be another personal computer, a server, a router, a network PC, a peer device or other common network node, and typically include many or all of the elements described above relative to the main computer system in which the systems can be embodied. The logical connections between computers include a local area network (LAN), a wide area network (WAN), virtual networks (WAN or LAN), and wireless LANs (WLAN) that can be presented here by way of example and not limitation. Such networking environments can be commonplace in office-wide or enterprise-wide computer networks, intranets, and the Internet.

When used in a LAN or WLAN networking environment, a computer system implementing aspects of the system may be connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It can be appreciated that the network connections described or shown can be exemplary and other mechanisms of establishing communications over wide area networks or the Internet may be used.

While various aspects have been described in the context of a preferred embodiment, additional aspects, features, and methodologies of the claimed systems can be readily discernible from the description herein, by those of ordinary skill in the art. Many embodiments and adaptations of the disclosure and claimed systems other than those herein described, as well as many variations, modifications, and equivalent arrangements and methodologies, can be apparent from or reasonably suggested by the disclosure and the foregoing description thereof, without departing from the substance or scope of the claims. Furthermore, any sequence(s) and/or temporal order of steps of various processes described and claimed herein can be those considered to be the best mode contemplated for carrying out the claimed systems. It should also be understood that, although steps of various processes may be shown and described as being in a preferred sequence or temporal order, the steps of any such processes can be not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same can become apparent from the information disclosed in the exhibits and the other applications as incorporated by reference. Variations and modifications to the disclosed systems and methods may be effected without departing from the spirit and scope of the novel concepts of the disclosure.

It can, nevertheless, be understood that no limitation of the scope of the disclosure may be intended by the information disclosed in the exhibits or the applications incorporated by reference; any alterations and further modifications of the described or illustrated embodiments, and any further applications of the principles of the disclosure as illustrated therein can be contemplated as would normally occur to one skilled in the art to which the disclosure relates.

The foregoing description of the exemplary embodiments has been presented only for the purposes of illustration and description and may be not intended to be exhaustive or to limit the devices and methods for using the same to the precise forms disclosed. Many modifications and variations can be possible in light of the above teaching.

The embodiments were chosen and described in order to explain the principles of the devices and methods for using the same and their practical application so as to enable others skilled in the art to utilize the devices and methods for using the same and various embodiments and with various modifications as can be suited to the particular use contemplated. Alternative embodiments can become apparent to those skilled in the art to which the present devices and methods for using the same pertain without departing from their spirit and scope. Accordingly, the scope of the present devices and methods for using the same may be defined by the appended claims rather than the foregoing description and the exemplary embodiments described therein.

What is claimed is:

1. A system comprising:
   a wireless communication device; and
   one or more controller devices operatively connected to the wireless communication device, wherein:
      the one or more controller devices are connected to each controller area network (CAN) bus of a plurality of CAN buses, the plurality of CAN buses comprising a first CAN bus having a first communication protocol and a second CAN bus having a second communication protocol that is different from, and incompatible with, the first communication protocol, each of the first and second protocols being configured to transmit CAN messages along the first and second CAN buses, respectively; and
      at least one of the one or more controller devices being configured to:
         receive a first CAN message from a first CAN device transmitted along the first CAN bus, wherein the first CAN message comprises a sequence of raw hexadecimal and binary digits formatted according to the first communication protocol;
         receive a second CAN message from a second CAN device transmitted along the second CAN bus, wherein the second CAN message comprises a sequence of raw hexadecimal and binary digits formatted according to the second communication protocol, wherein the at least one of the one or more controller devices is configured to concurrently receive the first CAN message and the second CAN message;
         convert the sequences of the raw hexadecimal and binary digits corresponding to the first CAN message and the second CAN message into a first processed CAN device message and a second processed CAN device message, respectively; and
         execute diagnostics on at least one processed CAN device message, the at least one processed CAN device message comprising the first processed CAN device message or the second processed CAN device message.

2. The system of claim 1, wherein executing the diagnostics on the at least one processed CAN device message comprises determining whether the at least one processed CAN device message is indicative of a device failure or a node failure.

3. The system of claim 1, wherein executing the diagnostics on the at least one processed CAN device message comprises:
   evaluating the at least one processed CAN device message to determine a current device characteristic for a device associated with the at least one processed CAN device message; and
   determining whether the current device characteristic has exceeded a corresponding device characteristic value.

4. The system of claim 3, wherein the current device characteristic is a runtime, a device temperature, a device position, or a device component position.

5. The system of claim 1, wherein executing the diagnostics on the at least one processed CAN device message comprises:
- executing a statistical analysis on the at least one processed CAN device message; and
- determining, based at least in part on the statistical analysis, a likelihood that a device associated with the at least one processed CAN device message is experiencing a particular device issue.

6. The system of claim 1, wherein executing the diagnostics on the at least one processed CAN device message comprises:
- executing a statistical analysis on the at least one processed CAN device message; and
- determining, based at least in part on the statistical analysis, a likelihood that a device associated with the at least one processed CAN device message will experience a particular device issue.

7. The system of claim 1, wherein executing the diagnostics on the at least one processed CAN device message comprises determining a running average of a total time required for a device to perform a particular task, the device being associated with the at least one processed CAN device message and the running average being based at least in part on the at least one processed CAN device message and historical CAN device messages.

8. The system of claim 7, wherein executing the diagnostics on the at least one processed CAN device message further comprises determining a fault is occurring or developing in the device in response to determining that the running average has increased by an amount greater than an expected time increase.

9. The system of claim 7, wherein executing the diagnostics on the at least one processed CAN device message further comprises determining a fault is occurring or developing in the device in response to determining that a current time required for the device to perform the particular task is outside an expected value range.

10. The system of claim 1, wherein executing the diagnostics on the at least one processed CAN device message comprises:
- executing a statistical analysis on the at least one processed CAN device message, the at least one processed CAN device message being associated with a first device; and
- determining, based at least in part on the statistical analysis, that a fault is occurring or developing in a second device, the second device being different from the first device.

11. The system of claim 1, wherein the first communication protocol comprises a J1939 protocol.

12. The system of claim 1, wherein the second communication protocol comprises a CANopen protocol.

13. The system of claim 1, wherein the at least one of the one or more controller devices is configured to:
- store, in at least one database, the first CAN message and the second CAN message according to their respective sequences of raw hexadecimal and binary digits; and
- process the first CAN message and the second CAN message according to predetermined mapping logic determined based on identification information extracted from the first CAN message and the second CAN message, wherein the predetermined mapping logic comprises bitwise scaling and offsetting calculations for converting the first CAN message and the second CAN message into a first CAN message expected value and a second CAN message expected value, respectively, represented in one or more real-world formats corresponding to the first CAN device and the second CAN device.

14. The system of claim 13, wherein the at least one of the one or more controller devices is further configured to compare the first CAN message expected value to a first predetermined expected value corresponding to the first CAN device, and to compare the second CAN message expected value to a second predetermined expected value corresponding to the second CAN device for diagnosing operational inefficiencies at the first CAN device and the second CAN device.

15. The system of claim 1, wherein the one or more controller devices is configured to read a sequence of binary signals corresponding to the first CAN message or the second CAN message, and store the sequence of binary signals into computer memory for subsequent processing.

16. A method, comprising the steps of:
- receiving, at one or more controller devices connected to each controller area network (CAN) bus of a plurality of CAN buses, a first CAN message from a first CAN device transmitted along a first CAN bus of the plurality of CAN buses, wherein the first CAN message comprises a sequence of raw hexadecimal and binary digits formatted according to a first CAN protocol;
- receiving a second CAN message from a second CAN device transmitted along a second CAN bus of the plurality of CAN buses, wherein the second CAN message comprises a sequence of raw hexadecimal and binary digits formatted according to a second CAN protocol, and wherein the second CAN protocol is different from and incompatible with the first CAN protocol, wherein the at least one of the one or more controller devices is configured to concurrently receive the first CAN message and the second CAN message;
- converting the sequences of the raw hexadecimal and binary digits corresponding to the first CAN message and the second CAN message into a first processed CAN device message and a second processed CAN device message, respectively; and
- executing diagnostics on at least one processed CAN device message, the at least one processed CAN device message comprising the first processed CAN device message or the second processed CAN device message.

17. The method of claim 16, wherein executing the diagnostics on the at least one processed CAN device message comprises determining whether the at least one processed CAN device message is indicative of a device failure or a node failure.

18. The method of claim 16, wherein executing the diagnostics on the at least one processed CAN device message comprises:
- evaluating the at least one processed CAN device message to determine a current device characteristic for a device associated with the at least one processed CAN device message; and
- determining whether the current device characteristic has exceeded a corresponding device characteristic value.

19. The method of claim 18, wherein the current device characteristic is a runtime, a device temperature, a device position, or a device component position.

20. The method of claim 16, wherein executing the diagnostics on the at least one processed CAN device message comprises:

executing a statistical analysis on the at least one processed CAN device message; and determining, based at least in part on the statistical analysis, a likelihood that a device associated with the at least one processed CAN device message is experiencing a particular device issue.

21. The method of claim 16, wherein executing the diagnostics on the at least one processed CAN device message comprises:

executing a statistical analysis on the at least one processed CAN device message; and determining, based at least in part on the statistical analysis, a likelihood that a device associated with the at least one processed CAN device message will experience a particular device issue.

22. The method of claim 16, wherein the first CAN protocol comprises a J1939 protocol.

23. The method of claim 16, wherein the second CAN protocol comprises a CANopen protocol.

24. The method of claim 16, further comprising reading a sequence of binary signals corresponding to the first CAN message or the second CAN message, and storing the sequence of binary signals into computer memory for subsequent processing.

25. A method, comprising the steps of:

receiving, at one or more controller devices connected to each controller area network (CAN) bus of a plurality of CAN buses, a first CAN message from a first CAN device transmitted along a first CAN bus of the plurality of CAN buses, wherein the first CAN message comprises a sequence of raw hexadecimal and binary digits formatted according to a first CAN protocol;

receiving a second CAN message from a second CAN device transmitted along a second CAN bus of the plurality of CAN buses, wherein the second CAN message comprises a sequence of raw hexadecimal and binary digits formatted according to a second CAN protocol, and wherein the second CAN protocol is different from and incompatible with the first CAN protocol;

executing a mask to prevent the one or more controller devices from receiving one or more transmitted CAN messages that comprise at least one of one or more predetermined undesirable message characteristics;

converting the sequences of the raw hexadecimal and binary digits corresponding to the first CAN message and the second CAN message into a first processed CAN device message and a second processed CAN device message, respectively; and executing diagnostics on at least one processed CAN device message, the at least one processed CAN device message comprising the first processed CAN device message or the second processed CAN device message, wherein executing the diagnostics on the at least one processed CAN device message comprises determining a running average of a total time required for a device to perform a particular task, the device being associated with the at least one processed CAN device message and the running average being based at least in part on the at least one processed CAN device message and historical CAN device messages.

26. The method of claim 25, wherein executing the diagnostics on the at least one processed CAN device message further comprises determining a fault is occurring or developing in the device in response to determining that the running average has increased by an amount greater than an expected time increase.

27. The method of claim 25, wherein executing the diagnostics on the at least one processed CAN device message further comprises determining a fault is occurring or developing in the device in response to determining that a current time required for the device to perform the particular task is outside an expected value range.

28. A method, comprising the steps of:

receiving, at one or more controller devices connected to each controller area network (CAN) bus of a plurality of CAN buses, a first CAN message from a first CAN device transmitted along a first CAN bus of the plurality of CAN buses, wherein the first CAN message comprises a sequence of raw hexadecimal and binary digits formatted according to a first CAN protocol;

receiving a second CAN message from a second CAN device transmitted along a second CAN bus of the plurality of CAN buses, wherein the second CAN message comprises a sequence of raw hexadecimal and binary digits formatted according to a second CAN protocol, and wherein the second CAN protocol is different from and incompatible with the first CAN protocol;

executing a mask to prevent the one or more controller devices from receiving one or more transmitted CAN messages that comprise at least one of one or more predetermined undesirable message characteristics;

converting the sequences of the raw hexadecimal and binary digits corresponding to the first CAN message and the second CAN message into a first processed CAN device message and a second processed CAN device message, respectively; and executing diagnostics on at least one processed CAN device message, the at least one processed CAN device message comprising the first processed CAN device message or the second processed CAN device message, wherein executing the diagnostics on the at least one processed CAN device message comprises:

executing a statistical analysis on the at least one processed CAN device message, the at least one processed CAN device message being associated with a first device; and determining, based at least in part on the statistical analysis, that a fault is occurring or developing in a second device, the second device being different from the first device.

29. A method, comprising the steps of:

receiving, at one or more controller devices connected to each controller area network (CAN) bus of a plurality of CAN buses, a first CAN message from a first CAN device transmitted along a first CAN bus of the plurality of CAN buses, wherein the first CAN message comprises a sequence of raw hexadecimal and binary digits formatted according to a first CAN protocol;

receiving a second CAN message from a second CAN device transmitted along a second CAN bus of the plurality of CAN buses, wherein the second CAN message comprises a sequence of raw hexadecimal and binary digits formatted according to a second CAN protocol, and wherein the second CAN protocol is different from and incompatible with the first CAN protocol;

executing a mask to prevent the one or more controller devices from receiving one or more transmitted CAN messages that comprise at least one of one or more predetermined undesirable message characteristics;

converting the sequences of the raw hexadecimal and binary digits corresponding to the first CAN message and the second CAN message into a first processed CAN device message and a second processed CAN device message, respectively;

executing diagnostics on at least one processed CAN device message, the at least one processed CAN device message comprising the first processed CAN device message or the second processed CAN device message;

storing, in at least one database, the first CAN message and the second CAN message according to their respective sequences of raw hexadecimal and binary digits; and processing the first CAN message and the second CAN message according to predetermined mapping logic determined based on identification information extracted from the first CAN message and the second CAN message, wherein the predetermined mapping logic comprises bitwise scaling and offsetting calculations for converting the first CAN message and the second CAN message into a first CAN message expected value and a second CAN message expected value, respectively, represented in one or more real-world formats corresponding to the first CAN device and the second CAN device.

30. The method of claim 29, further comprising the steps of: comparing the first CAN message expected value to a first predetermined expected value corresponding to the first CAN device, and comparing the second CAN message expected value to a second predetermined expected value corresponding to the second CAN device for diagnosing operational inefficiencies at the first CAN device and the second CAN device.

31. A non-transitory, computer-readable medium having instructions stored thereon that, when executed by one or more processors of a system, cause the system to:

receive, at one or more controller devices connected to each controller area network (CAN) bus of a plurality of CAN buses, a first CAN message from a first CAN device transmitted along a first CAN bus of the plurality of CAN buses, wherein the first CAN message comprises a sequence of raw hexadecimal and binary digits formatted according to a first CAN protocol;

receive a second CAN message from a second CAN device transmitted along a second CAN bus of the plurality of CAN buses, wherein the second CAN message comprises a sequence of raw hexadecimal and binary digits formatted according to a second CAN protocol, wherein the second CAN protocol is different from and incompatible with the first CAN protocol, and wherein at least one of the one or more controller devices is configured to concurrently receive the first CAN message and the second CAN message;

converting the sequences of the raw hexadecimal and binary digits corresponding to the first CAN message and the second CAN message into a first processed CAN device message and a second processed CAN device message, respectively; and executing diagnostics on at least one processed CAN device message, the at least one processed CAN device message comprising the first processed CAN device message or the second processed CAN device message.

32. The non-transitory, computer-readable medium of claim 31, wherein the predetermined data transfer throttle comprises a baud rate at which the one or more controller devices receives information from the first CAN device.

33. The non-transitory, computer-readable medium of claim 31, wherein the predetermined data transfer throttle comprises a sample rate at which the one or more controller devices receives information from the first CAN device.

* * * * *